(12) United States Patent
Ur et al.

(10) Patent No.: US 11,687,936 B2
(45) Date of Patent: Jun. 27, 2023

(54) SYSTEM AND METHOD FOR MANAGING CHARGEBACK RISK

(71) Applicant: Source Ltd., Valletta (MT)

(72) Inventors: Shmuel Ur, Shorashim (IL); Ilya Dubinsky, Kefar Sava (IL); Gregory Paks, Ashdod (IL)

(73) Assignee: Source Ltd., Valletta (MT)

( * ) Notice: Subject to any disclaimer, the term of this patent is extended or adjusted under 35 U.S.C. 154(b) by 319 days.

(21) Appl. No.: 16/858,752

(22) Filed: Apr. 27, 2020

(65) Prior Publication Data
US 2021/0334812 A1 Oct. 28, 2021

(51) Int. Cl.
*G06Q 20/40* (2012.01)
*G06Q 30/0201* (2023.01)
*G06Q 10/0635* (2023.01)

(52) U.S. Cl.
CPC ..... *G06Q 20/4016* (2013.01); *G06Q 10/0635* (2013.01); *G06Q 30/0201* (2013.01)

(58) Field of Classification Search
CPC .......... G06Q 20/4016; G06Q 10/0635; G06Q 30/0201; G06Q 30/0207–0277
See application file for complete search history.

(56) References Cited

U.S. PATENT DOCUMENTS

| | | | | |
|---|---|---|---|---|
| 10,825,028 | B1* | 11/2020 | Kramme | G06Q 30/0185 |
| 2007/0106582 | A1* | 5/2007 | Baker | G06Q 40/00 |
| | | | | 705/35 |
| 2012/0047053 | A1* | 2/2012 | Favreau | G06Q 40/00 |
| | | | | 705/35 |
| 2017/0178134 | A1* | 6/2017 | Senci | G06Q 20/4016 |

\* cited by examiner

*Primary Examiner* — Chinyere Mpamugo
(74) *Attorney, Agent, or Firm* — Pearl Cohen Zedek Latzer Baratz LLP

(57) ABSTRACT

A system and method of managing chargeback risk may include: receiving one or more projected transaction data elements, each comprising information pertaining to projection of future transactions among nodes of a computer network; receiving a plurality of actual transaction data elements, each comprising information pertaining to a respective plurality of actual transactions among nodes of the computer network; receiving one or more merchant profile data elements, each pertaining to a profile of one or more merchants, associated with nodes of the computer network; computing a distribution of chargeback risk for each actual transaction, based on the one or more actual transaction data elements and respective one or more merchant profile data elements; computing a clearance-period (CP) chargeback overage based on distribution of chargeback risk of actual transactions and the projected transaction data elements; and producing a suggestion for managing chargeback risk based on the CP chargeback overage.

18 Claims, 10 Drawing Sheets

SYSTEM AND METHOD FOR MANAGING CHARGEBACK RISK

FIELD OF THE INVENTION

The present invention relates generally to technology for management of data relating to transactions exchanged and processed over a computer network. More specifically, the present invention relates to systems and methods of managing data related to chargeback risk.

BACKGROUND OF THE INVENTION

In the field of financial technology ("Fintech"), a chargeback process is a process in which a credit card transaction is forcibly reversed. This process may be initiated by the cardholder's bank (e.g., following a request made by the cardholder or customer), also referred to as an issuing bank as a mechanism for consumer protection.

In contrast to traditional refunds of payments, in a chargeback process the consumer does not contact the business or the merchant for a refund, but rather asks the bank to forcibly take money from the business's account. An investigation follows, and if the bank feels the cardholder's request is valid, funds are removed from the merchant's account and returned to the consumer.

As known in the art, an "acquiring bank" or an "acquirer" is a bank or a financial institution that may processes paying card (e.g., credit card, debit card) payments on behalf of a merchant, and allows merchants to accept credit card payments from card-issuing banks within an association (e.g., the Visa, Mastercard, American Express, etc. systems).

The acquirer (e.g., an acquiring bank) may enter into a contract with a merchant and offer them a merchant account, providing the merchant with a line of credit. Under the agreement, the acquiring bank may exchange funds with issuing banks, associated with clients or buyers on behalf of the merchant, and may pay the merchant for their daily payment-card activity's net balance (e.g., gross sales minus reversals, interchange fees, and acquirer fees).

The process in which an acquirer may enter into a contract with a merchant, so as to process one or more paying card transactions on the merchant's behalf is hereby referred to as 'acquiring' the one or more transactions. In contrast, refusal of an acquirer to enter into a such a contract with a merchant is hereby referred to as a 'refusal' or 'dropping' of a transaction.

As known in the art, acquirer fees (e.g., an acquirer's revenue from specific paying card transactions) are normally set according to the acquirer's discretion, in correspondence to a risk level of specific transaction, as perceived by the acquirer. For example, a transaction of purchase of soft-drink cans in a vending machine may normally be characterized by a low risk level, as clients or purchasers would normally not initiate a chargeback of payment for such transactions. Therefore, acquirers may normally acquire such transactions with a minimal value of acquirer fees. In contrast, transactions pertaining to purchase of consumer electronics (e.g., televisions) are notorious for the large percentage of charged-back transactions. Therefore, acquirers may normally acquire such transactions while charging high acquirer fees.

From the viewpoint of the acquiring bank, the consequence of an excessive number of chargebacks may be grave: acquirer banks are normally obligated, through legally binding contracts, to pay large fines to credit card associations (e.g., Visa, Diners, etc.) in the occurrence of surpassing a predefined ratio of chargebacks from an overall number of commercial transactions. The ratio of charged-back transactions is normally calculated based on a clearance period such as a month, or any other calendar period. Therefore, acquirer banks normally make great effort to avoid surpassing the predefined allowed ratio of chargebacks.

However, the calculation or prediction of the ratio of chargeback may be difficult, because chargeback events typically do not occur at the same period of clearance (e.g., the same month) of the respective transaction. Instead, chargeback events are normally spread over time according to a time-wise distribution function, as elaborated herein (e.g., in relation to FIG. 2A).

For example, the month of December is typically characterized by a large volume of commercial transactions (e.g., due to holiday season shopping). The following months (e.g., January) often present a much lower volume of transactions. Therefore, chargeback events that occurred in January, but correspond to payment transactions that were performed in December may heavily affect the chargeback ratio of January (as elaborated herein, for example in relation to FIG. 2B). This may put the acquirer in jeopardy of surpassing the allowed threshold, and may incur a heavy fine on the acquirer.

SUMMARY OF THE INVENTION

Acquirers may therefore require a system and a method for managing and analyzing computer data related to transactions which may optimize their revenue from paying card (e.g., credit cards, debit cards, etc.) transactions. The term "optimizing" may be used in this context in a sense of minimizing occurrences of data relating to chargebacks and/or maximizing the revenue from incoming transactions (e.g., from acquirer fees associated with the transactions), while keeping a safe margin from the predetermined clearance period (CP) chargeback limit (e.g., a predetermined monthly chargeback limit).

Embodiments of the invention may analyze incoming transaction data to ascertain a condition of an acquirer bank in relation to a CP chargeback threshold and produce one or more suggestions or courses of action based on the analysis. For example, as elaborated herein, embodiments of the invention may analyze incoming transaction data to predict a future CP chargeback overage, such as chargeback overage at the end of a current month and/or chargeback overage at the end of a subsequent, future month. Embodiments of the invention may subsequently produce one or more suggestions according to the predicted overage.

Embodiments of the invention may refer to acquisition or refusal of transactions on a transaction-by-transaction basis. For example, embodiments of the invention may produce a suggestion data element that may include a suggestion or recommendation for the acquirer, whether to acquire or drop a specific transaction requested by a specific merchant, as elaborated herein. Additionally, or alternatively, embodiments of the invention may refer to acquisition or refusal of transactions on a policy basis. For example, embodiments of the invention may produce a suggestion data element that may include a recommendation or suggestion to bid for acquisition of transactions from specific merchants, based for example, on attractivity levels of such transactions, as elaborated herein.

For example, in a condition where a predicted CP (e.g., monthly) chargeback ratio for a current month is dangerously close to the predefined allowed chargeback limit, a suggestion may include the acquisition of a large volume of low-risk, low revenue transactions such as acquisition of transactions for purchasing drinks from an automated vending machine. Additionally, or alternatively, a suggestion may include refusal of acquisition, or 'dropping' of high-risk transactions requests by merchants (e.g., transaction requests for purchasing television sets), to decrease the ratio of charged-back transactions for the current month.

In a complementary example, in a condition where the predicted CP (e.g., monthly) chargeback ratio for an upcoming month is well below the predefined allowed chargeback limit, a suggestion may include acquisition of high-risk, high-revenue transactions, to increase the acquirer's revenue from paying card transactions.

Embodiments of the invention may include a method of managing chargeback risk by at least one processor of a computing device in a computer network. Embodiments may include: receiving one or more projected transaction data elements, each projected transaction data element may include information pertaining to projection of future transactions among nodes of the computer network; receiving a plurality of actual transaction data elements, each actual transaction data element may include information pertaining to a respective plurality of actual transactions among nodes of the computer network; receiving one or more merchant profile data elements each merchant profile data element pertaining to a profile of one or more merchants, associated with nodes of the computer network; computing a distribution of chargeback risk for each actual transaction, based on the one or more actual transaction data elements and respective one or more merchant profile data elements; computing a CP (e.g., monthly) chargeback overage based on distribution of chargeback risk of one or more actual transactions and the one or more projected transaction data elements; and producing a suggestion for managing chargeback risk based on the CP chargeback overage.

According to some embodiments of the invention, the one or more merchant profile data elements of a specific merchant may include, an identification of the merchant, a type of the merchant, a commercial category of the merchant, a volume of transactions, and a percentage of charged back transactions.

Embodiments of the present invention may include grouping the one or more merchants to merchant clusters, according to the one or more merchant profile data elements of the one or more merchants.

According to some embodiments of the invention, computing a distribution of chargeback risk for each actual transaction may be performed in real time, as a weighted function of one or more of: a distribution of chargeback risk pertaining to a merchant associated with the transaction; a distribution of chargeback risk of similar products; a distribution of propensity for chargeback pertaining to a specific time of year; a distribution of chargeback risk of similar transactions; and a price associated with the transaction.

Embodiments of the present invention may include computing the distribution of chargeback risk pertaining to a specific merchant by: detecting, from the data elements of actual transactions, chargeback events that pertain to a merchant cluster; computing a chargeback propensity of transactions pertaining to the merchant cluster; and computing the distribution of chargeback risk pertaining to a specific merchant as a weighted function of the percentage of charged back transactions of that merchant and the chargeback propensity of the respective merchant cluster.

Embodiments of the present invention may include retroactively updating the one or more merchant profile data elements according to incoming one or more actual transaction data elements; retroactively updating the distribution of chargeback risk according to the updated one or more merchant profile data elements; and producing one or more updated suggestions based on the updated distribution of chargeback risk.

According to some embodiments of the invention, the one or more actual transaction data elements may include an identification of a merchant associated a transaction, a volume of transactions, a price of one or more transactions, a revenue of the one or more transaction to an acquirer and events of transaction chargeback.

Embodiments of the present invention may include computing a transaction attractivity, for a transaction of the one or more transactions, representing an attractiveness of the transaction for an acquirer, based on the revenue of the transaction to an acquirer and on the distribution of chargeback risk for that transaction.

According to some embodiments of the invention, the one or more projected transaction data elements may include projected distribution over time of a volume of transactions; and projected distribution over time of chargeback risk. Embodiments of the present invention may include updating the one or more projected transaction data elements in view of incoming data elements of the plurality of actual transaction data elements.

According to some embodiments of the invention, computing CP chargeback overage may include summing the updated projected distribution of chargeback risk for each transaction, and comparing the sum to a predetermined CP chargeback threshold.

According to some embodiments of the invention, producing a suggestion may include: determining a policy of engagement, according to the CP chargeback overage; and producing one or more suggestions pertaining to respective one or more transactions, based on the determined policy of engagement and on the attractivity of the one or more respective transactions. The policy of engagement may include, for example, a number of transactions that need to be acquired; an identification of one or more merchants corresponding to the transactions that need to be acquired; a number of transactions that need to be dropped; and an identification of one or more merchants corresponding to the transactions that need to be dropped.

According to some embodiments of the invention, determining a policy of engagement, may include: producing a plurality of policies of engagement, each may include different policy data; and simulating each of the plurality of policies of engagement in view of the updated projected transaction data elements, to determine a policy of engagement that may be optimal in terms of the projected revenue of the one or more transactions and the CP chargeback overage. The suggestion may include, for example, a suggestion to accept or acquire a transaction, a suggestion to drop or deny a transaction, and/or a suggestion to bid for a transaction. Embodiments of the present invention may communicate the one or more suggestions to one or more computing devices of respective merchants and/or to one or more computing devices of respective acquirers.

Embodiments of the present invention may include receiving a transaction request; calculating an acquirer fee for the requested transaction based on at least one of the CP chargeback overage and attractivity of one or more other transactions; producing a suggestion to accept the requested transaction; and including the acquirer fee within the suggestion.

According to some embodiments of the invention, calculating the acquirer fee for the requested transaction may include: calculating an attractivity level for one or more second transactions; calculating a proportional contribution of overage for the one or more second transactions; starting from the transactions of the lowest attractivity, calculating the number of transactions that need to be dropped in order to avoid surpassing the CP chargeback threshold; and calculating the acquirer fee for the requested transaction as a sum of lost acquirer fees due to acceptance of the requested transaction.

Embodiments of the present invention may include a system for managing chargeback risk. Embodiments may include a non-transitory memory device, wherein modules of instruction code may be stored, and at least one processor associated with the memory device, and configured to execute the modules of instruction code.

Upon execution of said modules of instruction code, the at least one processor may be configured to: receive one or more projected transaction data elements, each projected transaction data element may include information pertaining to projection of future transactions among nodes of the computer network; receive a plurality of actual transaction data elements, each actual transaction data element may include information pertaining to a respective plurality of actual transactions among nodes of the computer network; receive one or more merchant profile data elements each merchant profile data element pertaining to a profile of one or more merchants, associated with nodes of the computer network; compute a distribution of chargeback risk for each actual transaction, based on the one or more actual transaction data elements and respective one or more merchant profile data elements; compute a CP chargeback overage based on distribution of chargeback risk of one or more actual transactions and the one or more projected transaction data elements; and produce a suggestion for managing chargeback risk based on the CP chargeback overage.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
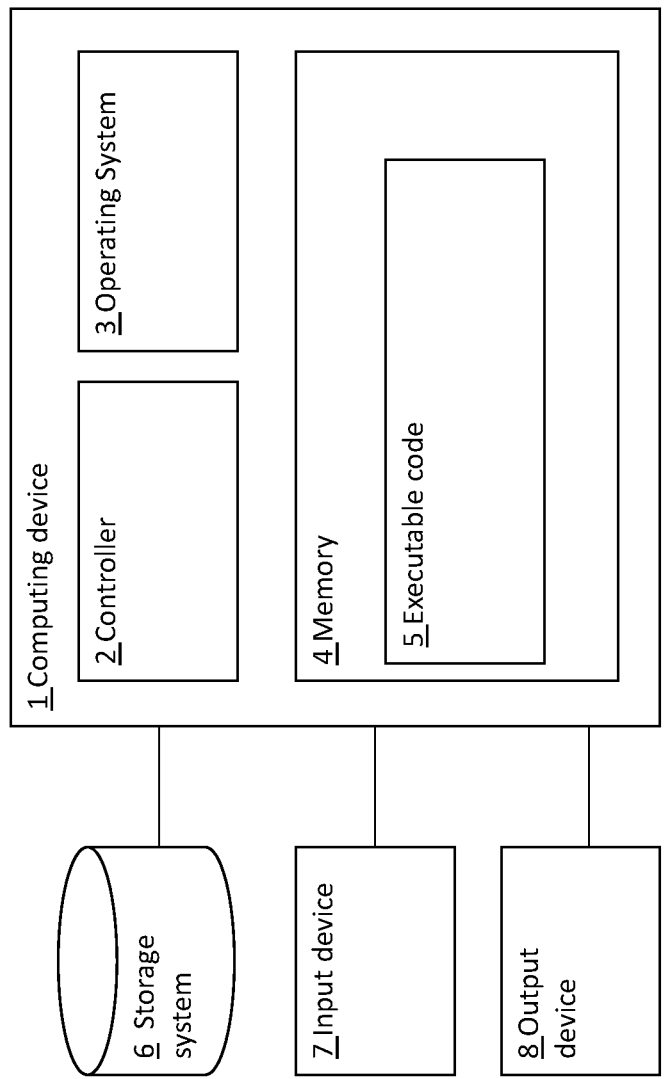
FIG. 1 is a block diagram, depicting a computing device which may be included in a system for managing chargeback risk according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The following table, Table 1, may serve as a non-limiting reference to terms that may be used throughout this document.

TABLE 1

| | |
|---|---|
| Node | The term 'Node' may be used herein to refer to a computing device, used for processing and/or routing transactions within a network of nodes. Nodes may include, for example: an individual computer, a server in an organization and/or a site operated by an organization (e.g. a data center or a server farm operated by an organization). For example, in Monetary Exchange (ME) transactions, nodes may include a server in a banking system, a computer of a paying-card issuer, etc. |
| Transaction | The term 'transaction' may be used herein to refer to communication of data between a source node and a destination node of a computer network. According to some embodiments, transactions may include a single, one-way transfer of data between the source node and the destination node. For example: a first server may propagate at least one data file to a second server as a payload within a transaction. Alternatively, transactions may include a plurality of data transfersbetween the source node and the destination node. For example, a transaction may be data describing or related to a purchase, by a client, of goods and/or services from a merchant. Such transaction may include a monetary exchange between two institutions (such as banks), operating computer servers and computer equipment, where in order to carry out the transaction data needs to be transferred between the servers and other computer equipment operated by the institutions. |
| Transaction request | The term "transaction request" may be used herein to refer to a request, made by one or more nodes of the computer network. For example, a transaction request may be received from one or more nodes of the computer network that may be or may include a computing device associated with or belonging to an acquirer entity (e.g., a banking server). It may be appreciated that data included in a transaction request (e.g., properties of a payment transaction) may eventually be also included in a corresponding transaction that may be routed between nodes of the computer network. Hence, the terms "transaction request" and "transaction" may be used intermittently, according to context. |
| Actual transactions | The term "Actual transactions" may refer herein to incoming computerized (e.g. binary) data elements pertaining to actual (e.g. current or past, as opposed to not yet existing) transaction requests and/or transactions that are transferred between source nodes and destination nodes of the computer network. For example, incoming actual transaction data elements may include: a volume and/or a number of transactions, acquirer revenues pertaining to a transaction, indication of occurrence of a chargeback event pertaining to a transaction, etc. |
| Projected transactions | The term "Projected transactions" may refer herein to computerized (e.g. binary) data elements pertaining to a projected distribution (e.g., a time-wise distribution) of one or |

TABLE 1-continued

| | |
|---|---|
| | more elements of future transactions. For example, projected transaction data elements may include projected distribution of: future volume, revenue, acquirer revenues and chargeback events pertaining to future transactions. According to some embodiments, data of projected transaction may be calculated based on statistical analysis of historical information relating to previous transactions. This may include, for example: projection of a number of future transactions during a specific time of year (e.g., around Christmas), based on relevant historical data pertaining to previous years. According to some embodiments, projected transaction data elements may be calculated by one or more computing devices that may be included within embodiments of a system of the present invention. Additionally, or alternatively, data of projected transaction may be calculated by one or more third-party computing devices (e.g., computing devices pertaining to nodes of the computer network), and may be received by embodiments of the invention for further analysis, as elaborated herein. |
| Merchant profile | The term "Merchant profile" may be used herein to refer to one or more computerized (e.g. binary) data elements corresponding to a specific merchant and/or a group of merchants. A merchant profile may include, for example, a field of work associated with the merchant (e.g., a specific industry or service provided by the merchant), a volume of transactions (e.g., a number of one or more transactions and or a size or price of the one or more transactions) processed by the merchant over a period of time (e.g., annually), a chargeback risk or propensity (e.g., a percentage of transactions of the merchant that have been charged back), and the like. |
| Chargeback risk, Chargeback propensity | The terms "chargeback risk" and "chargeback propensity" may be used herein interchangeably, to refer to a risk of chargeback of one or more transactions, and may depend on a specific context. For example, chargeback risk may relate to a specific transaction (e.g., the risk of having a specific transaction charged back). In another example, chargeback risk may relate to a specific merchant (e.g., the risk of having transactions conducted by the specific merchant to be charged back). In another example, chargeback risk may relate to a group or cluster of similar merchants (e.g., the risk of having transactions conducted by car dealers to be charged back). In another example, chargeback risk may relate to a group of similar products or services to be charged back (e.g., the risk of having transactions involving a sale of different types of television to be charged back). Additional examples are also possible. |
| Chargeback risk distribution, Chargeback propensity distribution | The terms "chargeback risk distribution" and "chargeback propensity distribution" may be used herein interchangeably, to refer to a distribution of a risk or propensity of chargeback, e.g., over time. For example, as explained herein (e.g., in relation to FIG. 2A), a distribution of chargeback risk may refer to the chance that one or more transactions (e.g., a specific transaction, transactions relating to a specific merchant, etc.) would be charged back over the time period (e.g., several months), following the initiation of the transaction (e.g., at a first day following the transaction, at a second day, following the transaction, etc.). |
| Chargeback ratio | The term "Chargeback ratio" may be used herein to refer to a number of charged-back transactions relevant to a specific acquirer, in relation to an overall number of transactions processed by a specific acquirer. It may be appreciated that the overall number of processed transactions may pertain to transactions that are performed or |

TABLE 1-continued

| | |
|---|---|
| | processed at a specific (e.g., a current) month, whereas the number of charged-back transactions pertains to occurrences of chargeback corresponding to transactions that were performed in the current month and/or in previous months (e.g., over the past three months). As elaborated herein, embodiments of the invention may include a practical application for predicting a chargeback ratio of an acquirer for a current month and for subsequent future months. Embodiments of the invention may derive from the predicted chargeback ratio at least one suggestion data element, pertaining to an acquirer. The suggestion data element may be adapted to mitigate a risk of surpassing a permitted chargeback ratio by the acquirer, while maintaining an optimal acquirer transaction revenue. |
| Chargeback limit | The term "Chargeback threshold" may be used herein to refer to a maximal chargeback ratio or percentage that may be permitted during a predefined time period (e.g., a calendar month) according to a legally binding contract between an acquirer and a credit card association (e.g., Visa, Mastercard). |
| Chargeback threshold | The term "Chargeback threshold" may be used herein to refer to a maximal chargeback ratio or percentage that may be permitted by embodiments of the invention during a predefined time period (e.g., a calendar month). In some embodiments, the chargeback threshold may be set below a value of a chargeback limit (e.g., that may be permitted according to a legally binding contract between an acquirer and a credit card association). For example, if a contract between an acquirer and a credit card company permits a chargeback limit ratio of 1%, embodiments of the invention may set the chargeback threshold to be 0.8%, leaving 0.2% as a safety buffer. |
| Chargeback overage | The term "Chargeback overage" may be used herein to refer to a number of charge back events, in a current clearance period (e.g., month) and/or in subsequent clearance periods (e.g., subsequent months) that must be avoided by an acquirer so as not to surpass the chargeback threshold. For example, if the chargeback threshold is 0.8% and an expected chargeback ratio for a specific month is 0.9%, then the acquirer may need to avoid at least 0.1% of chargeback events of that month to keep the expected chargeback ratio beneath the chargeback threshold. |
| Transaction Attractivity | The term "Transaction attractivity" may be used herein to refer to a quality of attractiveness of each transaction. As elaborated herein, embodiments of the invention may calculate the attractivity of each transaction as a function of the transaction's revenue and propensity of chargeback. Additionally, embodiments of the invention may produce one or more suggestions or courses of action (e.g. for managing a Fintech system) pertaining to one or more transactions based on the calculated transaction attractivity. |
| Neural network | The term "Neural network" (NN), e.g. an NN implementing machine learning, may refer to an information processing paradigm that may include nodes (e.g., different from the nodes of a computer network, described elsewhere herein), referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations. |

Reference is now made to FIG. 1, which is a block diagram depicting a computing device, which may be included within an embodiment of a system for managing chargeback risk, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention, e.g. a node, a NN, a server, etc.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may manage chargeback risk as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data corresponding to transactions between nodes of a computing system may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2A:
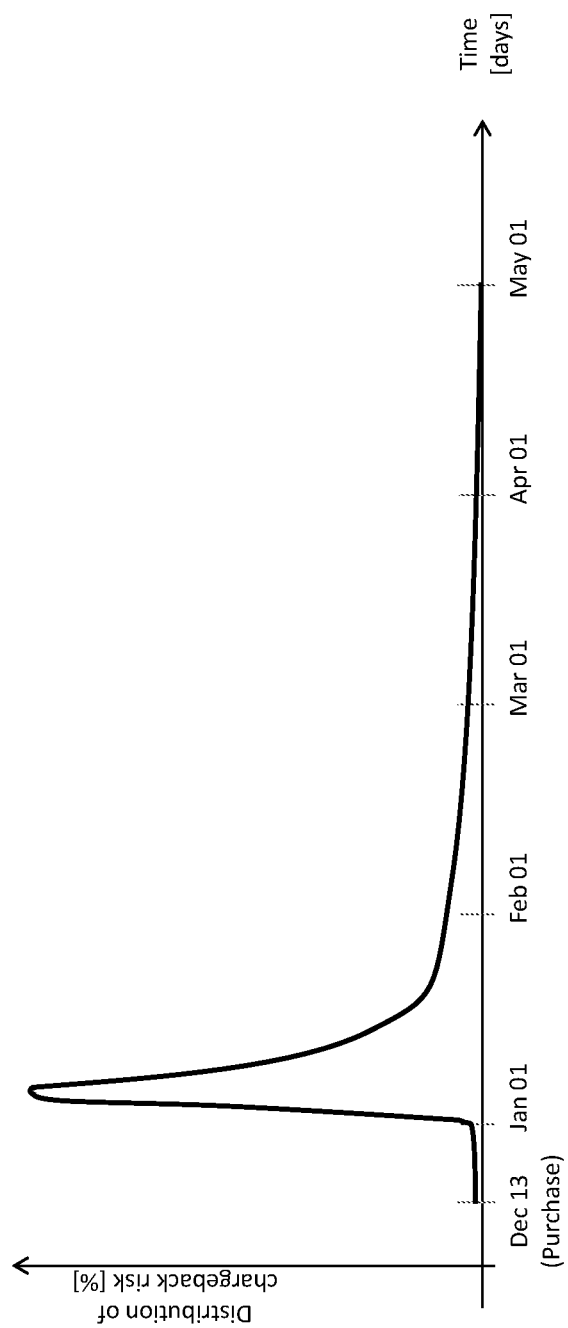
FIG. 2A is a schematic graphical representation of timewise distribution of chargeback risk according to some embodiments.

Reference is now made to FIG. 2A which is a schematic graphical representation of an example of a timewise distribution of chargeback risk. As shown in FIG. 2A, chargeback events typically do not occur at the same clearance period (e.g., the same month) of the respective transaction. Instead, chargeback events are normally spread over time according to a time-wise distribution function.

In the schematic example depicted in FIG. 2A, a purchase (e.g., of a product) has been performed on a specific date (e.g., the 13$^{th}$ day of December). As experience shows, clients seldom perform chargebacks until the following day of clearance (e.g., in this example, January 1$^{st}$), when they are presented with the data of their credit card and/or banking account.

The following period (e.g., in this example, the first days of January) may be most prone to initiation of chargeback by the client. The distribution of chargeback risk, pertaining to the specific transaction, gradually recedes until a limit date, at which initiation of chargeback is no longer permitted according to a customer's contract with the credit card association (e.g., in this example, 4 months after the initial clearance date).

Figure 2B:
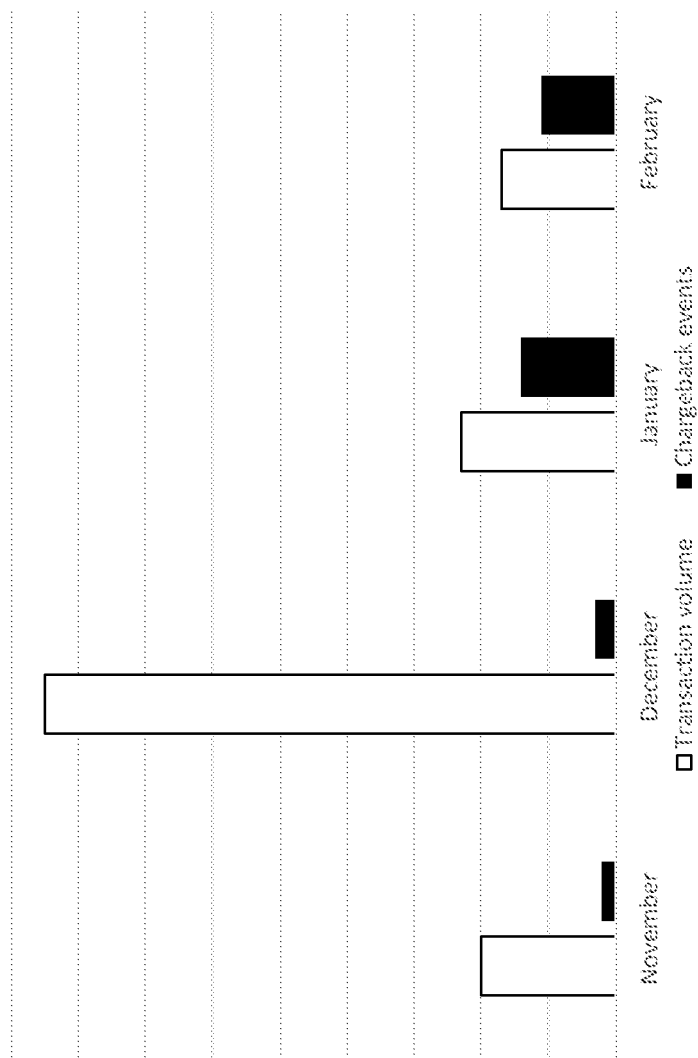
FIG. 2B is a schematic graphical representation of timewise distribution of monthly transaction volume and corresponding chargeback events according to some embodiments.

Reference is now made to FIG. 2B which is a schematic graphical representation of timewise distribution of CP (e.g., monthly) transaction number or volume (white columns) and corresponding chargeback events (black columns).

Due to the unevenness of the number or volume of transactions, acquirer computing devices (e.g., servers) may need to calculate a predicted chargeback ratio based not only upon current or actual transaction data, but also upon the projection of future transactions (e.g., a projection or prediction of a future number of chargeback events and a projection or prediction of a future number of transactions).

For example, and as depicted in the schematic example of FIG. 2B, a first month (e.g., December) may be characterized by a large volume of commercial transactions (e.g., due to holiday season shopping) and subsequent months (e.g., January, February) may present a much lower volume of transactions.

Due to the time-wise distribution of chargeback per specific transactions (as elaborated, for example in relation to FIG. 2A), chargeback events that correspond to payment transactions that took place in a first CP (e.g., the month of December) may in fact occur in the following, low-volume CPs (e.g., months of January and February).

Therefore, chargeback events relating to purchase of goods and services during a first CP (e.g., December) may heavily affect the chargeback ratio of subsequent CPs (e.g., January and February). This may put the acquirer in jeopardy of surpassing the allowed chargeback limit, and may incur a heavy fine on the acquirer.

Figure 3:
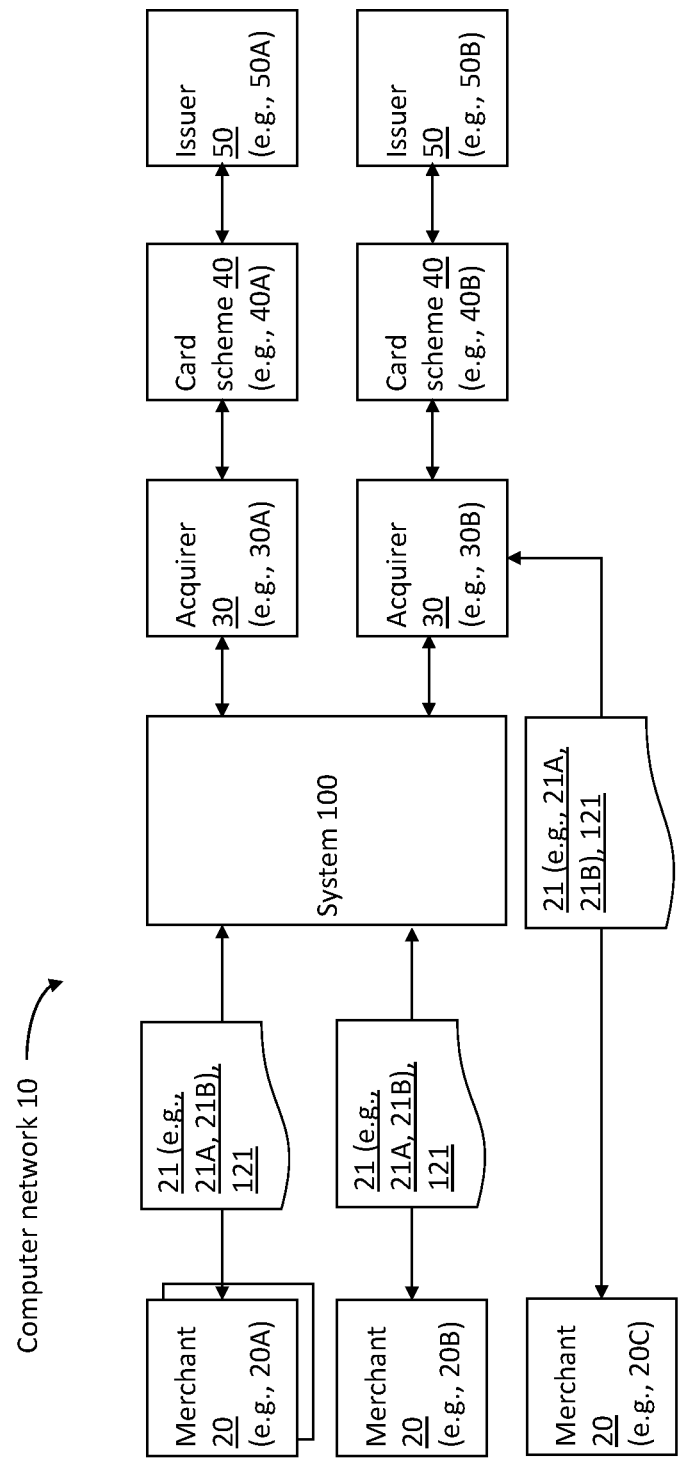
FIG. 3 is a block diagram, depicting a computer network that may include a system for managing chargeback risk, according to some embodiments.

Reference is now made to FIG. 3 which is a block diagram, depicting a computer network 10 that may include a system 100 for managing chargeback risk, according to some embodiments.

According to some embodiments of the invention, system 100 may be implemented as one or more software modules, one or more hardware modules or any combination thereof. For example, system 100 may be or may include one or more computing devices such as element 1 of FIG. 1, and may be adapted to execute one or more modules of executable code (e.g., element 5 of FIG. 1) to manage chargeback risk, as further described herein.

According to some embodiments, and as shown in FIG. 3, system 100 may be communicatively connected via a computer network 10 (e.g., the internet) to one or more computing devices (e.g., element 1 of FIG. 1) or nodes 20 of computer network 10 that may pertain to, be associated with or controlled by specific one or more merchants (e.g., merchant nodes 20).

Additionally, or alternatively, system 100 may be communicatively connected (e.g., via computer network 10) to one or more computing devices (e.g., element 1 of FIG. 1) or nodes 30 of computer network 10 that may pertain, be associated with or controlled by to one or more specific acquirers (e.g., acquirer nodes 30).

According to some embodiments, system 100 may receive one or more data elements 21 pertaining to or describing actual transactions (e.g., a transaction request from a merchant node 20) and may communicate the one or more transaction data elements 21 (e.g., the transaction request) to the corresponding acquirer computing devices 30.

Additionally, or alternatively, system 100 may receive one or more data elements 21 pertaining to or describing actual transactions (e.g., data pertaining to a transaction request), originating from a merchant 20 (e.g., from merchant node 20C) via a corresponding acquirer node 30 (e.g., 30B).

According to some embodiments, system 100 may act as a mediator between one or more computing nodes of an acquirer 30 and one or more computing nodes of a merchant 20. The term mediation may refer in this context to a condition that system 100 may receive data (e.g., a plurality of transaction requests) from a plurality of merchant 20 computing devices, apply algorithms for mitigation of chargeback risk, as elaborated herein, produce suggestions based on these algorithms and communicate said suggestions to the respective merchant computing devices and/or acquirer computing devices 30, in real-time or near real time.

For example, system 100 may analyze received data elements 21 to produce one or more suggestions or suggested actions 121, as elaborated herein. System 100 may subsequently communicate one or more data elements comprising one or more suggestions or suggested actions 121 back to merchant 20, as elaborated herein. The one or more suggestion 121 data elements may include, for example, a suggestion to acquire or accept one or more transaction requests, or to refuse or drop the one or more transaction requests.

According to additional or alternative embodiments, system 100 may not be communicatively connected to one or more of merchant nodes 20 of the plurality of merchant computing devices or nodes 20 (e.g., 20C). In such conditions, a merchant node (e.g., 20C) may be communicatively connected to an acquirer node 30 (e.g., 30B such as a banking server that may handle the merchant's banking account) and may communicate one or more actual transaction data elements 21 (e.g., a transaction request) to the respective acquirer node 30 (e.g., 30B). System 100 may receive the one or more data elements 21 from the acquirer computing device 30 (e.g., 30B). System 100 may subsequently respond with one or more data elements including one or more suggestions 121 or suggested actions 121 back to the acquirer 20 (e.g., 20C). The one or more suggestions 121 may, for example, include a suggestion to acquire the merchant's transaction (e.g., accept the merchant's transaction request) or to deny the merchant's transaction (e.g., refuse the merchant's transaction request).

According to some embodiments, acquirer computing device or node 30 may forward or route the one or more actual transaction data elements 21 (e.g., a payment transaction request) to a card scheme 40, based on the suggested action data element 121.

For example, if suggested action 121 includes a suggestion to acquire the transaction associated with actual transaction data element 21, then acquirer computing device or node 30 may forward or route the one or more actual transaction data elements 21 (e.g., the transaction request) to card scheme 40. In a complementary manner, if suggested action 121 includes a suggestion to refuse the transaction associated with actual transaction data element 21, then acquirer computing device or node 30 may refrain from forwarding or routing the one or more actual transaction data elements 21 to card scheme 40.

As known to persons skilled in the art of online banking, card scheme 40 may be a payment computer network linked to a payment card (e.g., a debit card or a credit card such as American Express, Mastercard, etc.). Card scheme 40 may facilitate a financial transaction, including for example transfer of funds, production of invoices, conversion of currency, etc., between the acquirer node 30 (associated with the merchant) and an issuer node 50 (associated with the consumer).

Card scheme 40 may route or forward the actual transaction data 21 (e.g., a payment transaction request) to an issuer computing device or node 50, in which the consumer's bank account may be handled, to process payment from the consumer to the merchant (e.g., transfer funds from the consumer's bank account to the merchant's bank account).

Figure 4A:
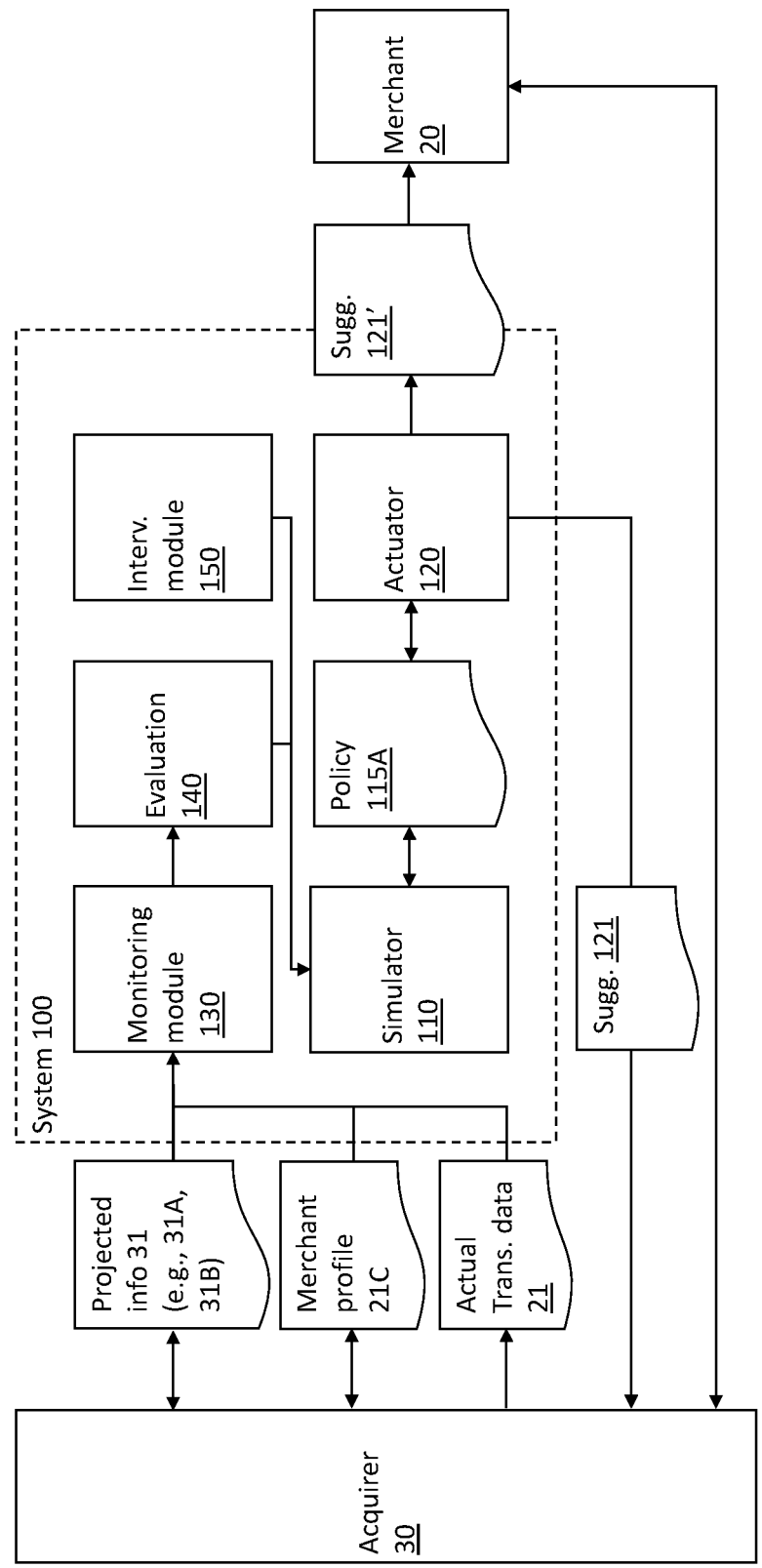
FIG. 4A and FIG. 4B is are block diagram, jointly depicting a system for managing chargeback risk, according to some embodiments.
Figure 4B:
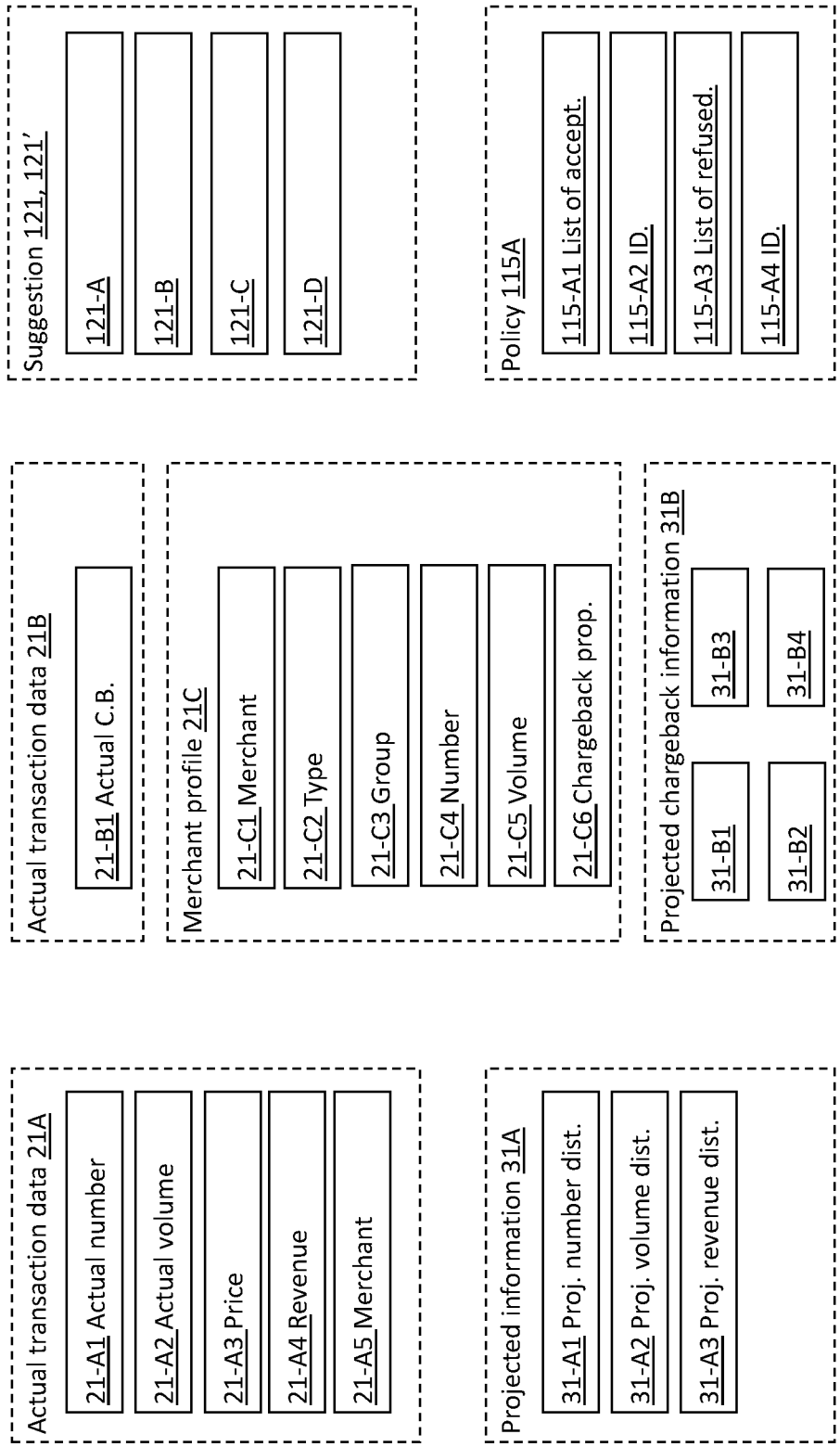
Figure 5:
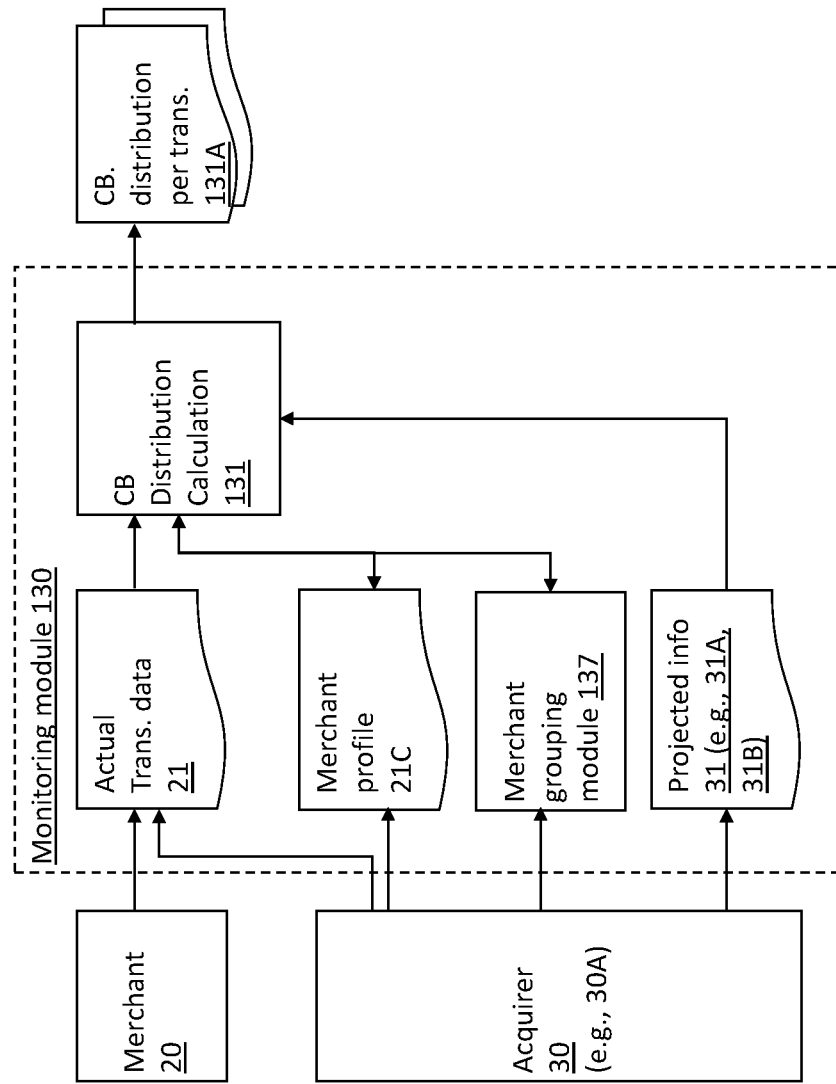
FIG. 5 is a block diagram, depicting a monitoring module that may be included in a system for managing chargeback risk, according to some embodiments.

Reference is now made to FIG. 4A and FIG. 4B which are block diagrams, jointly depicting a system 100 for managing chargeback risk, according to some embodiments. Reference is also made to FIG. 5 which is a block diagram, depicting a monitoring module 130 that may be included in system 100, according to some embodiments.

As shown in FIG. 4A, system 100 may receive one or more data elements (e.g. computer data elements) of projected transaction information 31. Data elements 31 may include, for example: (a) information pertaining to projected or future transactions 31A among nodes of computer network 10; and (b) information pertaining to projected or future chargeback events 31B.

For example, data elements 31A may include information pertaining to projection of payment transactions between acquirer nodes 30 and issuer nodes 50 of computer network 10. Such information may include, for example: (a) information describing timewise distribution of a number of expected transactions (e.g., element 31-A1 of FIG. 4B), such as a number of transactions that may be expected to occur over the following days, weeks or months; (b) information describing timewise distribution of a volume of expected transactions (e.g., element 31-A2 of FIG. 4B), such as a volume of transactions that are expected to occur over the following days, weeks or months; and (c) information pertaining to projected or expected timewise distribution of revenue (e.g., element 31-A3 of FIG. 4B) such as an expected acquirer revenue over the following days weeks and/or months due to the expected number and/or volume of transactions.

In another example, data elements 31B may include a projected or expected timewise distribution of chargeback events, such as a number of transactions that are expected to be charged back over the following days, weeks and/or months (e.g., element 31-B1 of FIG. 4B).

According to some embodiments, system 100 may receive the one or more data elements of projected transaction information 31 from the one or more acquirer nodes 30 or acquirer computing devices 30. For example, the one or more acquirer nodes 30 may accumulate transaction information over time, and may provide the one or more data elements 31 to system 100 as a statistical projection of the accumulated data.

According to some embodiments, the one or more acquirer nodes 30 may provide the projected transaction information 31 repeatedly or periodically. Alternatively the one or more acquirer nodes 30 may provide the projected transaction information 31 following an event such as a query for data initiated by system 100.

According to some embodiments, system 100 may maintain data elements 31 (e.g., in a storage device such as element 6 of FIG. 1). System 100 may, as elaborated herein, continuously (e.g., repeatedly over time) update or correct one or more values of stored projected transaction information data elements 31.

For example, in a condition that a plurality of incoming actual transaction data elements 21 include an unexpected surge of indications of actual chargeback events (e.g., beyond an expected number of chargeback events 31-B1 for a specific date in the month), embodiments may update stored projected transaction data element 31-B1 (e.g., the projected distribution of chargebacks) to reflect the incoming surge of chargeback events.

In a similar example, embodiments of the invention may update or correct one or more values of stored projected transaction information data elements 31A such as information describing timewise distribution of a volume of expected transactions (e.g., 31-A2), timewise distribution of a number of expected transactions (e.g., 31-A1) and/or information pertaining to projected or expected timewise distribution of revenue (e.g., 31-A3, distributed acquirer revenue).

According to some embodiments, system 100 may include a monitoring module 130, adapted to receive one or more (e.g., a plurality) of data elements 21 that may include information pertaining to respective one or more (e.g., a plurality) actual transactions among nodes of the computer network. As depicted in FIG. 4A, system 100 may receive the one or more data elements 21 of actual transaction from one or more respective merchant computing devices 20. Alternatively, the one or more merchant computing devices 20 may communicate data elements 21 to acquirer nodes 30, and system 100 may receive the one or more second data elements 21 via acquirer nodes 30.

According to some embodiments, the one or more data elements 21 may pertain to one or more specific transactions and may include transaction-specific information 21A, including for example: a number (e.g., element 21-A1 of FIG. 4B) of one or more specific transactions; a volume (e.g., element 21-A2) of the one or more specific transactions; a price or currency exchange (e.g., of a product, element 21-A3) included within the one or more specific transactions; a revenue (e.g., an acquirer revenue, element 21-A4) of the one or more specific transactions; and an identification of a merchant (e.g., element 21-A5) associated with the one or more specific transactions.

Additionally, or alternatively, the one or more data elements 21 may include data (e.g., an indication) pertaining to an actual occurrence of one or more events of transaction chargeback (element 21-B1) corresponding to one or more transactions.

According to some embodiments, monitoring module 130 may be adapted to receive one or more data elements 21 that may include information pertaining to a profile (element 21C) of one or more merchants (e.g., associated with merchant nodes 20 of computer network 10).

Embodiments of the invention may maintain the one or more merchant profile data elements 21C as any appropriate data structure, such as a table in a database on a storage device such as element 6 of FIG. 1.

Merchant profile data elements 21C may include one or more of: an identification of the relevant merchant (e.g., element 21-C1, which may correspond to merchant ID element 21-A5 of a specific transaction); a type of the merchant (e.g., element 21-C2, such as a wholesale merchant, retail merchant, etc.); a group, classification or a commercial category of the merchant (e.g., element 21-C3, such as a category of products and/or services provided by the merchant); a number of transactions pertaining to or performed by the merchant (e.g., element 21-C4, a number of transactions performed within specific CPs such as specific months of the year); a volume of transactions pertaining to or performed by the merchant (e.g., element 21-C5, a volume of transactions performed within specific CPs such as specific months of the year); and a percentage or ratio of charged-back transactions associated with the merchant (e.g., an amount of chargebacks within specific CPs such as specific months of the year).

According to some embodiments, monitoring module 130 may store (e.g., on storage device 6 of FIG. 1) the one or more merchant profile data elements 21C and may continuously (e.g., repeatedly, over time) update the one or more merchant profile data elements 21C according to incoming data, as elaborated herein.

According to some embodiments, monitoring module 130 may include a merchant grouping module 137, adapted to cluster or group the one or more merchants (e.g., associated with merchant nodes 20 of network 10) according to the merchant profile data elements 21C of the one or more merchants.

For example, merchant grouping module 137 may be or may include an NN, implementing an unsupervised clustering model as known in the art. The unsupervised clustering model may be adapted to group merchants of similar merchant profile data elements 21C to clusters (hereinafter merchant clusters).

According to some embodiments, monitoring module 130 may include a chargeback distribution calculation module 131, adapted to compute, in real-time or near real-time, a distribution of chargeback risk 131A, specific for each incoming actual transaction data element 21A.

The terms "real-time" and "near real-time" may refer, in this context, to indicate a time-frame that is substantially immediately, or shortly after the reception of the relevant actual transaction data element 21A. For example, as elaborated herein (e.g., in relation to FIG. 7), system 100 may be configured to produce and/or communicate one or more suggestions 121 to at least one acquirer node, in response to receiving a transaction request data element 21A, based on calculation of a distribution of chargeback risk 131A. Hence a period of time for calculating the distribution of chargeback risk 131A may be limited by a predefined, maximal latency (e.g., several seconds) of response time to the requested transaction 21A.

In some embodiments, transaction-specific chargeback risk distribution 131A may be or may include number or a set of numbers representing a predicted value of a risk, probability or propensity that a specific transaction will be charged-back within each of a plurality of CPs or time periods (e.g., months) following the transaction's clearance date. Pertaining to the example of FIG. 2A, data element 131A may include predicted probabilities that the transaction performed on December 13 will be charged back on each of the subsequent days and/or months (e.g., January through April).

According to some embodiments, chargeback distribution calculation module 131 may compute transaction-specific chargeback risk distribution 131A as a function (e.g., a weighted sum) of one or more of: the received one or more data elements of actual transactions 21 (e.g., 21A, 21B) and one or more respective merchant profile data elements 21C. For example, and as elaborated herein, transaction-specific chargeback risk distribution 131A may be calculated as a weighted function (e.g., a weighted sum) of one or more of: a distribution of chargeback risk pertaining to a merchant associated with the transaction (e.g., element 21-C6); a distribution of chargeback risk (e.g., element 31B) of similar products and/or pertaining to a specific time of year and/or to similar transactions; and a price 21-A3 associated with the transaction.

Additionally, or alternatively, module 131 may calculate transaction-specific chargeback distribution 131A based on historical data pertaining to the specific merchant (e.g., a car dealer) involved in the transaction, pertaining to similar merchants (e.g., other car dealers), similar transactions (e.g., other transactions that may include a purchase of a car) and/or information pertaining to the specific transaction (e.g., if actual transaction data 21B includes an indication of a chargeback event 21-B1 at a first CP (e.g., a first month), the transaction specific chargeback distribution may be nullified for subsequent CPs (e.g., for subsequent months).

For example, module 131 may calculate transaction-specific chargeback distribution 131A based on a function (e.g., a weighted sum) of (a) the merchant's propensity of chargeback (e.g., as indicated by chargeback propensity element 21-C6 of profile data element 21C of the relevant merchant); and (b) the propensity of chargeback as indicated by other merchants within the same merchant cluster or group (e.g., of grouping module 137). Additionally, or alternatively, module 131 may calculate transaction-specific chargeback distribution 131A in relation to a specific product and/or price (e.g., a price that may be indicated in the relevant actual transaction data element 21-A3).

In this example, transaction-specific chargeback distribution 131A may be calculated according to the non-limiting example of the following equation, Eq. 1:

$$\text{Transaction\_specific\_chargeback\_distribution(Time)}= \\ ((W1*\text{Merchant\_chargeback\_propensity(Time)}+ \\ W2*\text{Similar\_merchants\_chargeback\_propensity} \\ (\text{Time})+W3*\text{Product\_specific\_chargeback\_} \\ \text{propensity(Time)})*W4*\text{Price}) \quad \text{Eq. 1}$$

Where: Transaction_specific_chargeback_distribution is the calculated transaction-specific chargeback distribution (e.g., over time) 131A; Merchant_chargeback_propensity is chargeback propensity element 21-C6 (e.g., over time) of profile data element 21C of the relevant merchant; Similar_merchants_chargeback_propensity is the distribution (e.g., over time) of the propensity of chargeback as indicated by other merchants within the same merchant cluster or group of grouping module 137; Product_specific_chargeback_propensity may be a projected distribution (e.g., over time) of chargeback 31-B1 of the relevant, specific product (e.g., a television); Price may be a price of the relevant product, as indicated in the actual transaction data element 21-A3; and W1-W4 may be weight values, corresponding to the respective elements elaborated above.

Additionally, or alternatively, monitoring module 130 may detect, from the data elements of actual transactions 21, indication of one or more chargeback events 21B that pertain to a merchant cluster of merchant grouping module 137. Chargeback distribution calculation module 131 may subsequently compute a chargeback propensity of transactions that pertains to the merchant cluster 31-B4.

Chargeback distribution calculation module 131 may compute a distribution of chargeback risk 131A pertaining to a specific merchant and/or a specific transaction as a weighted function of the percentage of charged-back transactions of the specific merchant and the chargeback propensity of the respective merchant cluster. In this example, the Similar_merchants_chargeback_propensity parameter of Eq. 1 may be or may include the computed chargeback propensity distribution pertaining to the relevant merchant cluster 31-B4.

For example, the merchant may be a consumer electronics retailer, and profile data element 21C of the relevant merchant may include a propensity and/or a distribution of probability of the merchant to be charged back (e.g., element 21-C6) on transactions that include different consumer electronics products (e.g., a first value of propensity and/or distribution of probability for chargeback of a first product, a second value pertaining to a second product, etc.). Actual transaction data element 21-A3 may pertain to a sale of a television, so the relevant chargeback risk element in the merchant's profile in this example may be the propensity and/or distribution of probability of chargeback of television sale transactions. The element of propensity of chargeback of television sale transactions may be accumulated or combined in a weighted sum with additional propensities and/or distribution for chargeback risk pertaining to similar merchants and/or products (e.g., consumer electronics retailers in the same city) of a respective merchant cluster (e.g., of merchant grouping module 137).

Additionally, or alternatively, data pertaining to chargeback risk of a product may be inferred, determined or complemented by chargeback distribution calculation module 131 based on a distribution of chargeback risk of similar products (e.g., according to a rule-based decision). For example, a propensity and/or a distribution (e.g., over time) of probability of chargeback (e.g., element 31-B1) of a first transaction 21A, such as a sale of a first television at a first price may be initially unknown. However, chargeback distribution calculation module 131 may complement the missing data by a known probability of chargeback (31-B1) of a second transaction 21A, such as a sale of a second television at a second price. For example, if the first price is higher than the second price, chargeback distribution calculation module 131 may infer a similarly higher propensity and/or distribution of chargeback 31-B1 for the first transaction. In this example, the calculation of the transaction specific chargeback distribution over time, as elaborated in the non-limiting example of equation Eq. 1 may be modified as in the non-limiting example of Equation Eq. 2:

$$\text{Transaction\_specific\_chargeback\_distribution(Time)}= \\ ((W1*\text{Merchant\_chargeback\_propensity(Time)}+ \\ W2*\text{Similar\_merchants\_chargeback\_propensity} \\ (\text{Time})+W3'*\text{Similar\_product\_chargeback\_} \\ \text{propensity(Time)})*W4*\text{Price}) \quad \text{Eq. 2}$$

Where Similar_product_chargeback_propensity is the propensity or distribution (e.g., over time) of the probability of chargeback (e.g., element 31-B1) of the second, similar product (e.g., the second television). This element replaces Product_specific_chargeback_propensity of equation Eq. 1, and W3' replaces the respective weight element W3 of Eq. 1.

Additionally, or alternatively, calculation of the transaction-specific chargeback risk distribution 131A may include accumulation of a weighted value of one or more data elements of projected information 31 (e.g., 31A, 31B). Pertaining to the example of the television, actual transaction data element 21A may include one or more data elements pertaining to the specific time of year that the sale has been performed. Projected information 31B may include a distribution of propensity for chargeback 31-B1 pertaining to that time of year. For example, in a condition where the sale is performed one month before a Superbowl football game (a period notoriously known for a high risk of chargeback of television sales), module 131 may include, in the calculation of transaction-specific chargeback risk distribution 131A, a weighted value of the relevant propensity of chargeback 31-B1 for that time of year, from projected information 31B. In this example, Eq. 1 may include (e.g., as part of Product_specific_chargeback_propensity (Time) and/or as part of W3), the elevated level of chargeback distribution pertaining to the relevant time of year.

Additionally, or alternatively, calculation of the transaction-specific chargeback risk distribution 131A may include a normalization of the calculated chargeback distribution 131A by a time-wise normalization factor, according to an overall distribution of chargeback events.

For example, the one or more data elements of transaction projections 31B may include information that may pertain to, or describe an overall projected distribution of chargeback events over time (e.g., element 31-B2) such as a number of chargeback events that may be expected to occur in the following days, weeks, months, etc. In this condition, Eq. 2 may be modified to include a correction factor 31-B2, as in the non-limiting example of Eq. 3 below:

$$\begin{aligned}\text{Transaction\_specific\_chargeback\_distribution(Time)}=\\ ((W1*\text{Merchant\_chargeback\_propensity(Time)}+\\ W2*\text{Similar\_merchants\_chargeback\_propensity}\\ \text{(Time)}+W3'*\text{Similar\_product\_chargeback\_}\\ \text{propensity(Time)})*W4*\text{Price}*W5*\text{overall\_}\\ \text{projected\_distribution\_of\_chargeback}))\end{aligned}\quad\text{Eq. 3}$$

where is the overall projected distribution of chargeback 31-B2 and W5 is a weight value.

Additionally, or alternatively, module 131 may normalize or modify the transaction-specific chargeback risk distribution 131A according to the overall projected distribution of chargeback events. For example, in a period (e.g., a season) that is normally characterized by a high chargeback ratio for a specific product (e.g., purchase of coats in the summer), module 131 may normalize (e.g., increase) transaction-specific chargeback risk distribution 131A to match the overall projected distribution of chargeback events. In a Additionally, or alternatively, calculation of the transaction-specific chargeback risk distribution 131A may include time-wise normalization of the calculated chargeback distribution 131A, according to a timewise distribution of chargeback of similar transactions.

For example, the one or more data elements of transaction projections 31B may include information that includes distribution of chargeback of similar transactions (e.g., element 31-B3, such as chargeback distribution for purchase of televisions), as depicted in the example of FIG. 2A. Module 131 may normalize the transaction-specific chargeback risk distribution 131A according to the distribution of chargeback of similar transactions (e.g., according to the shape of the graph depicted in FIG. 2A).

Additionally, or alternatively, calculation of the transaction-specific chargeback risk distribution 131A may include normalization of the calculated chargeback distribution 131A according to a price 21-A3. (e.g., as manifested, for example by the 'Price' element of Eq. 3).

According to some embodiments, chargeback distribution calculation module 131 may update the calculated transaction-specific chargeback risk distribution 131A retroactively, according to incoming actual transaction data elements 21 (e.g., 21A, 21B, 21C) in real-time or near real time. The term 'retroactive' may refer in this context to a correction of a transaction specific chargeback risk distribution over time 131A, where the transaction has already been acquired in the past.

For example, in an onset of a period of economic recession, monitoring module 130 may receive a plurality of incoming data elements of actual transactions 21B that may include an indication of occurrence of a chargeback event. In this example, if the overall number of incoming indications of chargeback events 21-B1 exceeds a predefined or precalculated threshold, then chargeback distribution calculation module 131 may update the transaction specific chargeback risk distribution 131A (e.g., as calculated in Eq. 1), by further multiplying Transaction_specific_chargeback_distribution of Eq. 1 by a correction factor W6.

In another example, monitoring module 130 may receive one or more incoming data elements of actual transactions 21B that may include an indication of occurrence of a chargeback event, associated with a specific merchant 20. Monitoring module 130 may subsequently update one or more data elements pertaining to the specific merchant's profile 21C. For example, monitoring module 130 may increase a value representing the merchant's propensity for chargeback, or distribution of chargeback propensity over time 21-C6, by a correction factor, due to the newly indicated chargeback event(s). In a complementary manner, in a condition that a specific merchant has not been related to chargeback events, monitoring module 130 may decrease the merchant's distribution of chargeback propensity over time 21-C6 by the correction factor, as elaborated in the following equation Eq. 4:

$$\begin{aligned}\text{Updated\_merchant\_CB\_propensity(Time)}=\text{Original\_}\\ \text{merchant\_CB\_propensity(Time)}*\text{correction\_}\\ \text{factor}\end{aligned}\quad\text{Eq. 4}$$

where Updated_merchant_CB_propensity and Original_merchant_CB_propensity are the updated and original merchant chargeback propensity distribution over time 21-C6, respectively, and correction_factor is the correction factor set by occurrence or non-occurrence of chargeback events, as elaborated above.

As elaborated herein (e.g., in relation to Eq. 1), module 131 may calculate transaction-specific chargeback risk distribution 131A based on the respective merchant's profile data element 21C (e.g., according to Updated_merchant_CB_propensity of Eq. 4). Thus, module 131 may update the transaction-specific chargeback risk distribution 131A retroactively, based on one or more incoming actual transaction data elements 21B pertaining to the same merchant.

As elaborated herein (e.g., in relation to FIG. 7) system 100 may be configured to produce one or more suggestions 121 or suggested actions 121 that may be based on, or updated according to the updated distribution of chargeback risk 131A.

Figure 6:
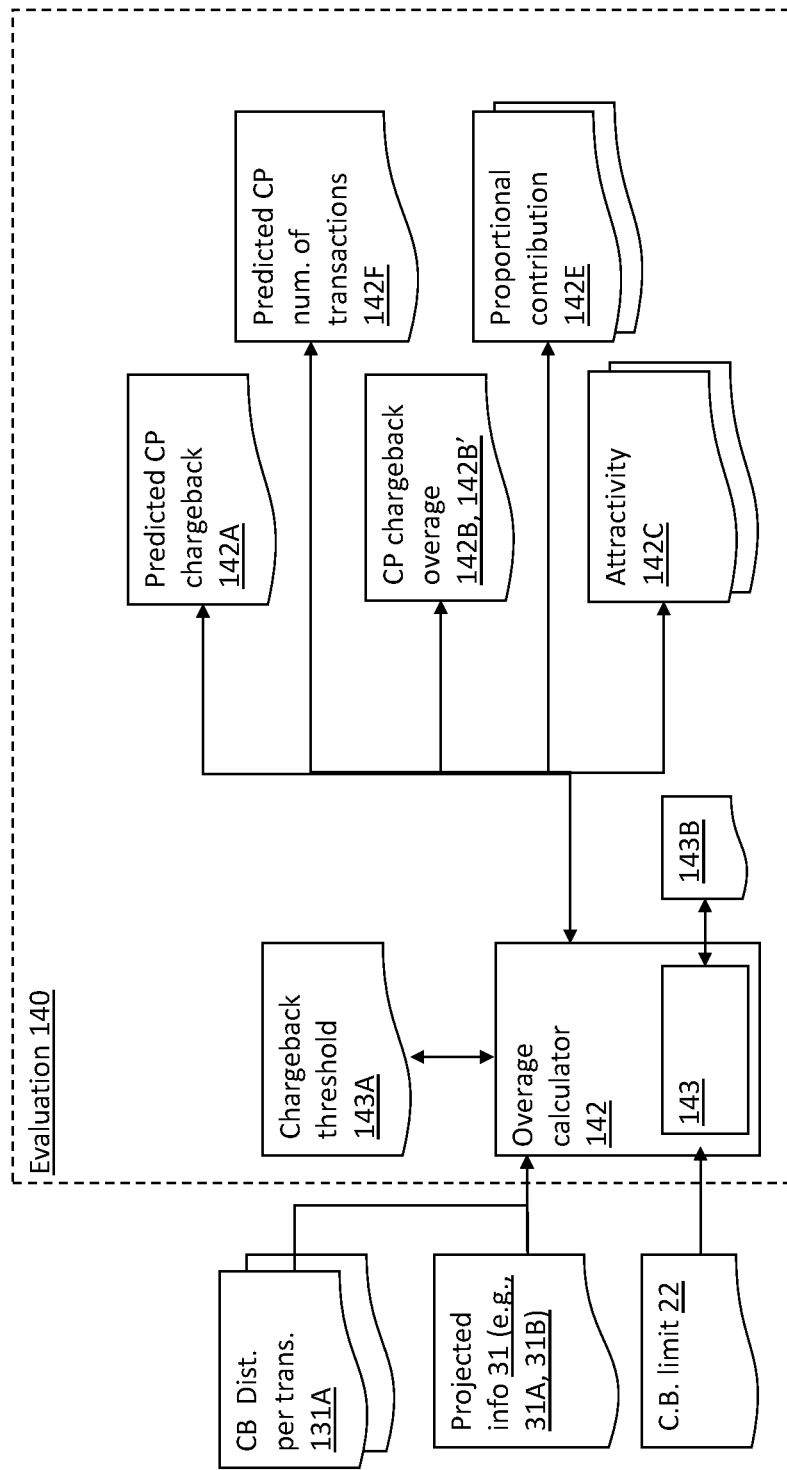
FIG. 6 is a block diagram, depicting an evaluation module that may be included in a system for managing chargeback risk, according to some embodiments.

Reference is now made to FIG. 6 which is a block diagram, depicting an evaluation module 140 that may be included in a system 100 for managing chargeback risk, according to some embodiments.

As elaborated herein (e.g., in relation to FIG. 4B), the one or more data elements of projected information 31 may include projected distribution over time of a volume 31-A2 and/or number 31-A1 of transactions and/or a projected distribution over time of chargeback risk 31B (e.g., 31-B1, 31-B2, 31-B3).

According to some embodiments, evaluation module 140 may be configured to update one or more data elements of projected transactions 31 (e.g., 31A, 31B) in view of incoming data elements of the plurality of second data elements of actual transactions 21 (e.g., 21A, 21B).

For example, as explained herein (e.g., in relation to FIG. 5) monitoring module 130 may calculate, in real time or near real time, distribution of chargeback risk 131A pertaining to specific actual transaction data elements 21 (e.g., 21A, 21B, 21C). Evaluation module 140 may accumulate a plurality of real-time chargeback risk distribution data elements 131A, each corresponding to an actual transaction data element 21A of a plurality of incoming actual transactions. According to some embodiments, evaluation module 140 may accumulate the plurality of real-time chargeback risk distribution data elements 131A according to clearance periods such as months, to obtain an updated, predicted distribution of overall CP (e.g., monthly) chargeback events 142A.

The term 'overall' may be used in this context to indicate a prediction of distribution pertaining to all transactions of the accumulation period (e.g., pertaining to all transactions of a current month and/or all transactions of subsequent, future months). The term 'updated' may be used in this context to indicate that the predicted number of CP (e.g., monthly) chargebacks events 142A may include information pertaining to actual incoming transaction data 21 (e.g., indications of occurrences of chargeback events 21B and/or actual transactions 21A), and may thus be more up-to-date than the projected monthly number of chargebacks that may be included in projected information 31B (e.g., 31-B1), that may, for example rely on historically accumulated statistics of previous chargeback events.

In another example, evaluation module 140 may continuously accumulate a number 21-A1 or volume 21-A2 of actual transaction data elements 21A of a plurality of incoming actual transactions during a clearance period (e.g., a month). Evaluation module 140 may compare the accumulated data with a projected distribution over time of a number 31-A1 or volume 31-A2 of transactions. For example, evaluation module 140 may ascertain whether a number of incoming transactions from a beginning of a CP (e.g., a month) until the current date corresponds to (e.g., equivalent to, higher than or lower than) a predicted distribution over time of a volume 31-A2 or number 31-A1 of transactions, and produce an updated predicted CP (e.g., monthly) volume 31-A2 or number 31-A1 of expected transactions 142F accordingly. In other words, it may be appreciated that an initial value of the predicted number of transactions 142F may initially be equivalent to a projected number of transactions 31-A1 (that may be included in data elements of projected information 31) but may continuously, e.g., in real-time or near real time, change as the CP (e.g., the month) progresses, in response to incoming transactions.

According to some embodiments, evaluation module 140 may receive (e.g., from a user, via input element 7 of FIG. 1) a chargeback threshold 143A. Chargeback threshold 143A may correspond to, or represent a maximal value of allowable chargeback ratio (e.g., as a percentage of chargedback transactions from the overall number of transactions) that may be permitted by system 100.

For example, in a condition in which an acquirer (e.g., node 30 of FIG. 3) is bound by contract with a credit association (e.g., the Visa organization) to maintain the chargeback ratio beneath a predefined chargeback limit 22 (e.g., 1% from the overall volume or number of transactions per month), chargeback threshold 143A may be selected to be lower than chargeback limit 22 (e.g., 0.8%), taking the margin (e.g., 0.2%) as a safety buffer.

According to some embodiments, overage calculator 142 may be configured to dynamically (e.g., over time, or through an iterative process) modify chargeback threshold 143A. For example, chargeback threshold 143A may be initially set to a default value, and may for example change over time according to the predicted number of transactions 142F.

For example: a condition in which the value of the predicted number of transactions 142F is high may be less volatile, in a sense that the prediction of chargeback ratio may be done more accurately in relation to conditions in which the predicted number of transactions 142F is low. Hence overage calculator 142 may raise chargeback threshold 143A when the predicted number of transactions 142F is high, to provide higher revenue to the acquirer 30, while avoiding a risk of surpassing the chargeback ratio permitted by the credit association (e.g., Visa, Mastercard).

Additionally, or alternatively, overage calculator 142 may include a machine learning (ML) based module 143, such as an ML module that includes a neural network, adapted to automatically and/or dynamically (e.g., based on incoming data pertaining to actual transactions) calculate a value of chargeback threshold 143.

For example, ML-based module 143 may be configured to receive one or more data elements pertaining to: (a) merchant profile 21C (e.g., elements 21-C1 through 21-C6 of FIG. 4B), (b) information 31A pertaining to projected or future transactions among nodes of computer network 10 (e.g., elements 31-A1 through 31-A3 of FIG. 4B), and/or (c) projected distribution over time of chargeback risk 31B (e.g., elements 31-B1 through 31-B3 of FIG. 4B). As elaborated herein, said received data elements (e.g., merchant profile 21C, projected information 31A, etc.) may be dynamically (e.g., in real time or near real time) updated according to incoming actual transaction data (e.g., elements 21A, 21B of FIG. 4B). ML module 143 may be adapted to predict, as commonly referred to in the art, a propensity or probability 143B in which predicted CP chargeback 142A (e.g., predicted monthly chargeback for a current month and/or for a subsequent, future month) would surpass a chargeback limit 22 as dictated by a credit association (e.g., Visa, American Express, etc.).

As elaborated herein, embodiments of the invention may produce one or more suggestions and/or perform one or more actions based on chargeback threshold 143A, to obtain a maximal acquirer revenue while mitigating the risk of surpassing chargeback limit 22. According to some embodiments, ML module 143 may predict probability 143B, given a specific (e.g., default) chargeback threshold 143A (e.g., in view of the system's activity). Overage calculator 142 may subsequently, and dynamically modify chargeback threshold 143A, according to predicted probability 143B.

According to some embodiments, evaluation module 140 may be configured to compute, in real-time or near real-time, a value of at least one CP (e.g., monthly, as in of the current month and of the subsequent one or more months) chargeback overage ratio 142B. Evaluation module 140 may calculate said at least one CP chargeback overage ratio 142B based on at least one of a distribution of chargeback risk 131A of one or more actual transactions, and based on one or more data elements of projected information 31 (e.g., 31A, 31B), as elaborated herein.

CP (e.g., monthly) chargeback overage ratio (CP_chargeback_overage_ratio) 142B may, for example, be calculated as a difference between a predicted chargeback ratio (e.g., the ratio between the predicted number of CP (e.g., monthly) chargebacks events (Predicted_Number_of_CP_Chargebacks) 142A and the updated, predicted number of transactions (predicted_number_of_transactions) 142F) and the chargeback threshold (chargeback threshold) 143A (e.g., 0.8% in this example), as shown by the following equation Eq. 5:

$$\text{CP\_chargeback\_overage\_ratio} = (\text{Predicted\_Number\_of\_CP\_Chargebacks}/\text{predicted\_number\_of\_transactions}) - \text{chargeback\_threshold} \quad \text{Eq. 5}$$

Where: CP_chargeback_overage_ratio is the CP (e.g., monthly) Chargeback Overage Ratio 142B, Predicted_Number_of_CP_Chargebacks is the Predicted Number of CP (e.g., monthly) Chargeback events 142A, predicted_number_of_transactions is the Predicted Number of Transactions 142F during the CP, and chargeback_threshold is the Chargeback Threshold 143A.

As seen in Eq. 5, the CP (e.g., monthly) chargeback overage ratio 142B may have a positive value, meaning that the predicted CP (e.g., monthly) chargeback ratio is expected to surpass the chargeback threshold 143A, for a relevant CP (e.g., month), or a negative value, meaning that the predicted CP chargeback ratio is not expected to surpass the chargeback threshold 143A, for the relevant CP.

Additionally, or alternatively, as elaborated herein, the projected distribution of chargeback risk for each transaction (e.g., element 131A) may be updated based on incoming data elements 21 of actual transactions. For example, an indication of occurrence of a chargeback event 21B pertaining to a transaction involving a specific merchant 20 may cause system 100 to update a value (e.g., chargeback propensity element 21-C6) of a profile 21C of the specific merchant (e.g., 21-C1). This change may in turn cause distribution calculation module 131 to change or update the distribution of chargeback risk 131A of transactions associated with the specific merchant, as elaborated herein (e.g., in relation to FIG. 5). Evaluation module 140 may subsequently compute or update a CP (e.g., monthly) chargeback overage ratio 142B by (a) summing the updated projected distribution 131A of chargeback risk for each transaction, and (b) comparing the sum to the CP chargeback threshold 143A (e.g., as elaborated in Eq. 5).

According to some embodiments, overage calculator 142 may be configured to compute an attractivity value 142C that may represent a level of attractivity for one or more transactions, included in or associated with actual transactions data elements 21A as elaborated herein (e.g., in relation to Eq. 7, below).

According to some embodiments, attractivity level 142C may represent a level of attractiveness of specific transactions for an acquirer 30 and may be based on a revenue (e.g., acquirer revenue 21-A4) of the one or more transactions to acquirer 30 and on the distribution of chargeback risk 131A for that transaction (e.g., as calculated in Eq. 1).

System 100 may subsequently produce one or more suggestions 121 based on the attractivity level 142C of each transaction. For example, system 100 may produce a first suggestion 121 to drop a transaction (e.g., refuse a transaction request of a merchant) that may have a low level of attractivity. In a complementary manner, system 100 may produce a second suggestion 121 to acquire a transaction (e.g., accept a transaction request of a merchant) that may have a high level of attractivity.

In other words, embodiments of the invention may produce one or more suggestions or suggested actions (e.g., elements 121 of FIG. 4A), for managing chargeback risk. Suggestions 121 may, for example, be directed to one or more acquirer node 30, and may include suggestions for refusal or acceptance of transaction requests included in transaction data elements 21A. Suggestions 121 may be based on attractivity 142C of one or more transactions, which may in turn be based on a CP (e.g., monthly) chargeback overage ratio 142B, as elaborated herein.

Additionally, or alternatively suggestions 121 may, for example, be directed to one or more acquirer nodes 30 and/or merchant nodes 20, and may include a proposition to acquire one or more future transactions, as elaborated herein.

According to some embodiments, evaluation module 140 may compute, per each CP (e.g., month), a CP (e.g., monthly) chargeback overage value 142B' as a total number of chargeback events that surpass chargeback threshold 143A.

For example, if: (a) the predicted number of transactions 142F is 10,000, (b) the predicted number of CP (e.g., monthly) chargebacks events 142A is 100 (thus the predicted chargeback ratio is 100/10,000=1%); and (c) chargeback threshold 143A is 0.8%, then the CP (e.g., monthly) chargeback overage value 142B' is 20 ((1%−0.8%)*10,000). In other words, in this condition and at that current date, 20 predicted charge-back events must be avoided by the acquirer during that CP to avoid surpassing chargeback threshold 143A.

The CP (e.g., monthly) chargeback overage value (CP_Chargeback_Overage_Value) 142B' may be viewed in relation to the chargeback distribution of each transaction 131A to ascertain a proportional contribution 142E of each transaction to the overage, according to the following equation, Eq. 6:

$$\text{Proportional\_Contribution}142E(CP,\text{Transaction}) = \text{if } (CP\_Chargeback\_Overage\_Value142B' =< 0), \text{ then:0else:(sum over the } CP(Chargeback\_Distribution\_per\_Transaction131A))/ CP\_Chargeback\_Overage\_Value142B', \quad \text{Eq. 6}$$

where: Proportional_Contribution 142E is the proportional contribution 142E of a specific transaction in a specific CP; Chargeback_Distribution_per_Transaction 131A is the chargeback distribution per transaction 131A; and CP_Chargeback_Overage_Value 142B' is the CP (e.g., monthly) chargeback overage value 142B'.

Pertaining to the same numerical example, in which a CP (e.g., monthly) chargeback overage value 142B' is 20, if an accumulation of a chargeback distribution of a specific transaction 131A during that CP (e.g., the predicted probability of chargeback of that transaction during that month) is 0.5%, then the ratio between the CP (e.g., monthly) chargeback overage value 142B' (e.g., 20) and accumulation of a chargeback distribution of a specific transaction 131A during that CP (e.g., 0.5%) will yield a proportional contribution 142E of 1/4000 (e.g., 0.5%/20). In other words, in order to avoid surpassing chargeback threshold 143A (e.g., 0.8%), system 100 will need to reject or refuse 4000 transactions such as the specific transaction of Eq. 6.

It may be appreciated that the computed proportional contribution 142E as elaborated above (e.g., 1/4000 transactions) may be a first approximation of the actual number, because the actual refusal of transactions will effectively reduce the total number of transactions for that CP and consequently change the predicted number of chargeback events. Hence, embodiments of the invention may perform the elaborated computation in an iterative manner, to obtain a more accurate value of proportional contribution 142E.

According to some embodiments, evaluation module 140 may compute an attractivity level of a specific transaction per each CP (e.g., month) as a ratio of the transaction revenue 21-A4 (e.g., included in transaction data 21A of FIG. 4B) and the transaction's proportional contribution 142E according to the following equation, Eq. 7:

$$\text{Transaction attractivity level}142C(CP,\text{Transaction}) = \text{transaction revenue}21\text{-}A4(\text{transaction})/\text{Proportional\_Contribution}142E(CP,\text{transaction}) \quad \text{Eq. 7}$$

where Proportional_Contribution 142E is the proportional contribution 142E of a specific transaction in a specific CP (e.g., month).

In other words, a first transaction may be considered more attractive for an acquirer (e.g., associated with an acquirer node 30) than a second transaction during a specific CP, if the first transaction is associated with a higher revenue (e.g., a higher acquirer revenue) than that of the second transaction, and/or if the first transaction provides a lower proportional contribution 142E to the risk of surpassing chargeback threshold 143A, in comparison to that of the second transaction.

According to some embodiments, evaluation module 140 may update transaction attractivity level 142C continuously, e.g., periodically and/or in response to receiving one or more actual transaction data elements 21 (e.g., elements 21A, 21B, 21C of FIG. 4B).

For example, a specific transaction 21A may pertain to sale of a specific model of a car by a specific car dealer. Detection of a malfunction in that car model may cause a plurality of chargeback events 21B (e.g., including a plurality of incoming chargeback indications 21-B1) relating to similar products (e.g., similar car models) and/or similar merchants (e.g., car dealers). This may lead to an increased risk of chargeback in the specific merchant's profile (e.g., element 21-C6 of FIG. 5), and subsequently lead to an increased transaction-related chargeback distribution 131A. This in turn may decrease the transaction's attractivity level 142C.

Figure 7:
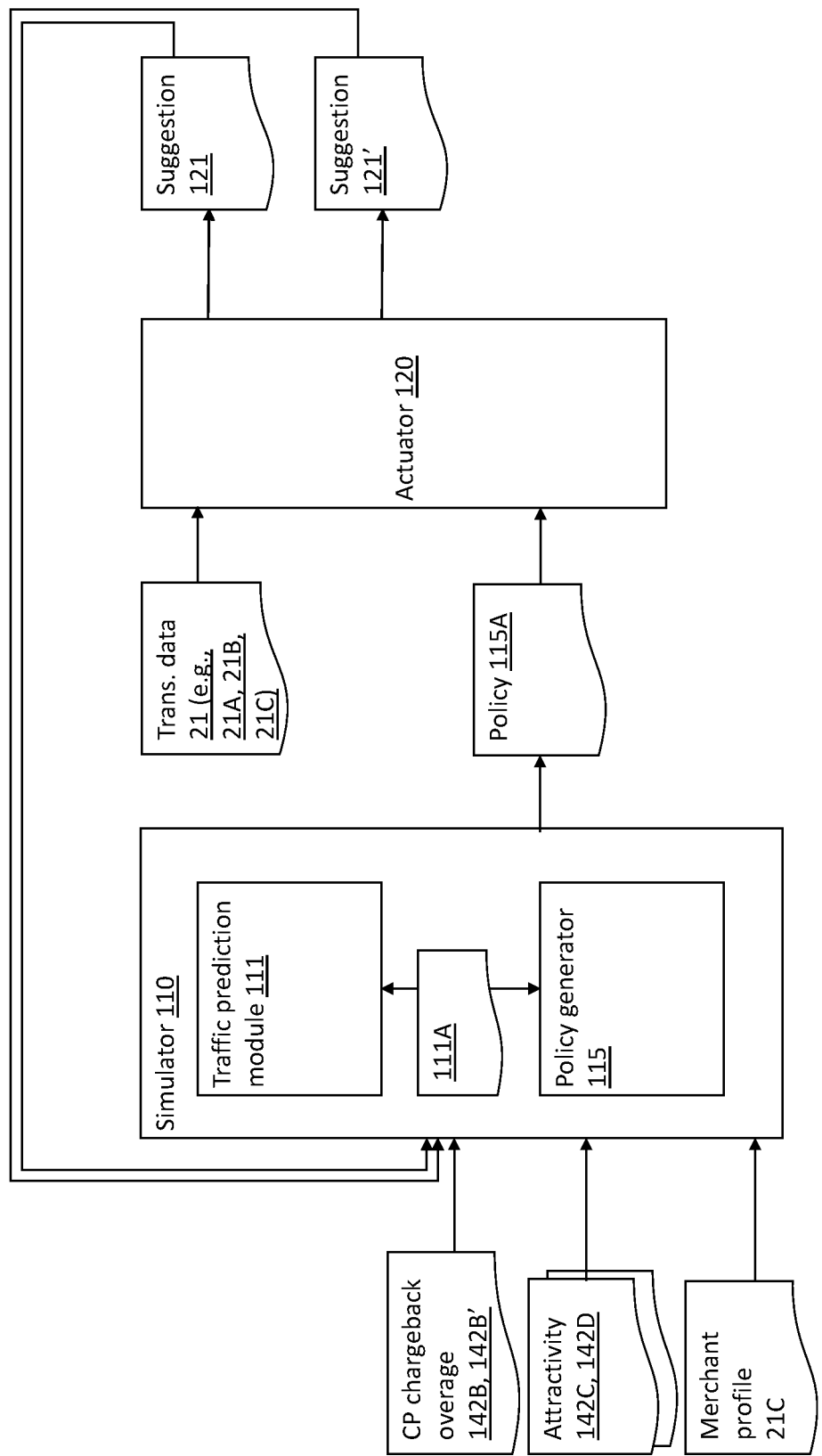
FIG. 7 is a block diagram, depicting a simulator module and an actuator module that may be included in a system for managing chargeback risk, according to some embodiments.

Reference is now made to FIG. 7 which is a block diagram, depicting a simulator module 110 and an actuator module 120 that may be included in a system for managing chargeback risk (e.g., system 100 of FIG. 4A), according to some embodiments.

According to some embodiments, and as elaborated below, simulator module 110 may include a traffic prediction module 111. Traffic prediction module 111 may be adapted to receive or accumulate historical data elements pertaining to actual transactions 21 (e.g., data elements 21A, 21B of FIG. 4B). Based on the accumulated data of actual transactions 21, traffic prediction module 111 may be adapted to produce a simulation or prediction of future events 111A, such as future actual transactions 21A and/or future actual transaction chargeback events 21B. Pertaining to a previously provided example, traffic prediction module 111 may be adapted to produce a prediction data element 111A, based on historically accumulated data, that may include a surge in transactions pertaining to purchase (e.g., future actual transactions 21A) of televisions (e.g., from consumer electronic merchants having respective profiles 21C) just before the NBA playoff season, and a surge of chargebacks (e.g., future actual chargebacks 21B) pertaining to the same merchants soon afterwards.

According to some embodiments, simulator module 110 may further include a policy generator module 115, adapted to receive at least one data element 111A of predicted or simulated future events, to produce one or more (e.g., a plurality) of policies of engagement data elements 115A, each comprising different policy data as elaborated herein, (e.g., in relation to FIG. 4B, and further below).

According to some embodiments, traffic prediction module 111 may in turn receive one or more data elements 115A of policies of engagement back from policy generator module 115, and may simulate the effect of each produced engagement policy 115A on incoming transactions 21 or transaction requests. Thus, simulator 110 may be adapted to simulate an effect of applying an engagement policy on the influx of transactions and/or chargeback events. For example, in a condition that a policy 115A may include an increase of an acquirer fee 121-C for one or more specific merchants (having respective profiles 21C), data element 111A of predicted traffic may include a future (e.g., lower) predicted number of incoming transaction 21 from the respective merchants.

Additionally, or alternatively, traffic prediction module 111 may receive one or more suggestion data elements (e.g., elements 121, 121'), and produce a data element 111A of predicted traffic that may include predicted traffic. For example, if a suggestion data element 121' includes bidding of one or more transactions at a low acquirer fee 121-C, (e.g., future actual transactions 21A) data element 111A of predicted traffic may include a simulation or prediction of a future (e.g., higher) number or volume of future actual transactions 21A.

According to some embodiments, policy generator module 115 may produce a policy of engagement 115A according to one or more data elements such as: the CP (e.g., monthly) chargeback overage (e.g., elements 142B, 142B' of FIG. 6), one or more merchant profile data elements (e.g., elements 21C of FIG. 4B) and/or one or more data elements of attractivity (e.g., element 142C of FIG. 6) pertaining to one or more transactions.

According to some embodiments, a policy of engagement data element 115A may include or describe an overall policy that may be required by system 100 under a current condition. Policy of engagement data element 115A (hereinafter "policy 115A") may include, for example, at least one of: (a) a list of transactions that would need to be dropped and (b) a list of transactions that would need to be acquired. Said lists may be populated and ordered according to their respective attractivity 142C and may be associated with their corresponding merchants.

According to some embodiments, policy generator module 115 may receive one or more data elements 111A describing a simulated or predicted number of predicted future transactions 21A chargeback events 21B and/or respective merchant profiles 21C. Policy generator module 115 may produce a policy of engagement data element 115A that may include, for example data such as: a number or a list of transactions that need to be acquired (e.g., data element 115-A1 of FIG. 4B); an identification of one or more merchants corresponding to the transactions that need to be acquired (e.g., data element 115-A2 of FIG. 4B); a number or a list of transactions that need to be refused or dropped (e.g., data element 115-A3 of FIG. 4B); and/or an identification of one or more merchants corresponding to the transactions that need to be refused or dropped (e.g., data element 115-A4 of FIG. 4B).

According to some embodiments, the list of transaction to be refused 115-A3 may be an ordered list, populated according to each transaction's proportional contribution 142E to the risk of surpassing chargeback threshold 143A, such that the transactions of the highest proportional contribution 142E may be selected to be dropped or refused. Additionally, or alternatively, the list of transactions to be refused 115-A3 may be an ordered list, populated according to each transaction's level of attractivity 142C, such that the transactions of the lesser level of attractivity 142C may be selected to be dropped or refused. Additionally, or alternatively, the number of elements (e.g., transactions) in the list of transaction to be refused 115-A3 may be calculated according to the CP chargeback overage 142B', such that the sum of the proportional contribution 142E of the transactions populating the list of transaction to be refused 115-A3 may be equal to, or surpass the CP chargeback overage 142B' (thus taking into account the probability of each transaction to be chargedback).

According to some embodiments, the list of transactions that need to be acquired (e.g., data element 115-A1 may be an ordered list, populated according to each transaction's level of attractivity 142C, such that the transactions of the higher level of attractivity 142C may be selected to be acquired.

For example, in a condition that CP (e.g., monthly) chargeback overage 142B is high (e.g., above a first predefined threshold), the policy of engagement 115A may be to avoid high-risk transactions as much as possible and refuse transaction requests from merchants who show a high rate of chargebacks in their profile 21C.

In another example, in a condition that CP chargeback overage 142B is moderate (e.g., below the first predefined threshold, but above a second predefined threshold) the policy of engagement 115A may be to avoid high-risk transactions according to each transaction's attractivity level 142C.

In a complementary example, in a condition that the predicted CP chargeback 142A is low (e.g., when the monthly chargeback overage 142B is negative), the policy of engagement 115A may be to acquire high-risk transactions at a high acquirer's fee, to increase the acquirer's revenue.

As elaborated herein (e.g., in relation to Eq. 7), transaction attractivity level 142C of a specific transaction may be calculated for a plurality of clearance periods (e.g., months). It may therefore be appreciated that policy 115A may be determined for the current clearance period (e.g., month) and for the following clearance periods. For example, as depicted in FIG. 2B, policy 115A may dictate that a high-risk transaction may be acquired in November, if the bulk of the charge-back risk distribution (e.g., as depicted in FIG. 2A) occurs on the following CP (e.g., in December), due to the high number and/or volume of transactions in December.

According to some embodiments, actuator module 120 apply at least one policy of engagement on actual incoming transactions (e.g., transaction requests) 21. For example, actuator module 120 may receive a policy of engagement 115A and/or one or more data elements pertaining to actual, incoming transactions or transaction requests 21 (e.g., 21A, 21B). Actuator module 120 may produce one or more suggestions 121 to one or more acquirer nodes 30 (e.g., as shown in FIG. 4A), according to the dictated policy 115A and pertaining to the one or more transactions corresponding to the received data elements 21.

For example, in a condition that CP (e.g., monthly) chargeback overage 142B is high, policy 115A may include a list 115-A3 of simulated transactions pertaining to high-risk merchants. In the event that an incoming transaction request 21 (e.g., purchase of a television just before the NBA playoffs) pertains to such a high-risk merchant (e.g., a consumer electronics dealer), actuator module 120 may, for example, produce a suggestions 121 to one or more acquirer nodes 30 that may include refusal to acquire the respective transaction request 21A. Alternatively, actuator module 120 may produce a suggestion to acquire the request only if the acquirer's fee is set to a high level.

Additionally, or alternatively, actuator module 120 may produce one or more suggestions 121' to one or more merchant nodes 30 (e.g., as shown in FIG. 4A). For example, in a condition that CP chargeback overage 142B is high, policy 115A may include a list of low-risk simulated transactions 115-A1 that may be associated with low-risk merchants or have a low proportional contribution to the CP overage. Actuator module 120 may consequently (e.g., actively, not necessarily in response to an incoming transaction request) produce one or more suggestions 121' to one or more merchant nodes 30 that are profiled 21C as low risk merchants (e.g., according to the list 115-A1 of policy 115A). The one or more suggestions 121' may include a proposal or a contract to acquire a large amount of future, low risk transactions, at a low acquirer's fee, in an attempt to increase the number or volume of incoming transactions 21A, and decrease the CP chargeback overage 142B. The transactions may be referred to as future transactions as they may not related to actual incoming transaction data 21. The transactions may be referred to as low risk transaction as they may have a projected chargeback distribution 31-B1 that may be beneath a predefined threshold.

In another example, in a condition that CP chargeback overage 142B is high (e.g., above a predefined threshold) for the current CP, but moderate or low for the subsequent CP, the one or more suggestions 121' may include a proposal or a contract to acquire a large amount of future transactions that may have a moderate risk level (e.g., have a projected chargeback distribution 31-B1 that is above the predefined threshold), so as to decrease the current CP's chargeback overage 142B at the expense of the subsequent CP. Moreover, acquiring future transactions that may have a moderate or high risk level as elaborated in this example, may allow the acquirer to charge a high acquirer fee, and thus improve a revenue for the subsequent CP.

According to some embodiments, and as depicted in FIG. 4B, suggestion 121 may correspond to a specific received transaction request 21A, and may include, for example: a suggestion or recommendation to accept or acquire the transaction request (e.g., 121-A), a suggestion or recommendation to deny or drop the transaction request (e.g., 121-B), and an acquirer fee that may be associated with the transaction request (e.g., 121-C).

In a complementary manner, suggestion 121' may not relate to a specific transaction request 21A, and may include one or more data elements pertaining to bidding (e.g., 121-D) for one or more transactions. For example, suggestion 121' may include a volume or number of transactions in the bid and an acquirer fee that may be associated with the transactions in the bid.

According to some embodiments, actuator 120 may communicate (e.g., over communication network 10 of FIG. 3) the one or more suggestions (e.g., 121, 121') to respective one or more computing devices of respective one or more merchants 20 and or one or more acquirers 30.

As elaborated herein, system 100 may receive a transaction request 21, and actuator 120 may calculate an acquirer fee 121-C corresponding to the requested transaction 21. System 100 may then produce a suggestion 121 and/or 121 (e.g., to accept the requested transaction) and may include the calculated acquirer fee 121-C within the suggestion 121. Additionally, or alternatively, system 100 may include acquirer fee 121-C within a suggestion 121' to bid for a transaction.

According to some embodiments, actuator 120 may calculate acquirer fee 121-C (or modify a predefined default value of acquirer fee 121-C) based on at least one of: CP (e.g., monthly) chargeback overage 142B', a number of transactions that need to be refused or dropped (e.g., data element 115-A1 of FIG. 4C), and/or one or more respective transaction-specific attractivity levels 142C.

For example, in a condition that chargeback overage 142B' is positive (e.g., predicted CP chargeback 142A surpasses chargeback threshold 143A), actuator 120 may: (a) calculate, for one or more (e.g., each) transaction 21 the corresponding value of attractivity 142C (e.g., as elaborated in Eq. 7); (b) calculate, for one or more (e.g., each) transaction 21 the proportional contribution of overage 142E (e.g., as elaborated in Eq. 7); starting from the transactions of the lowest attractivity 142C, calculating the number of low-attractivity transactions that need to be dropped in order to avoid surpassing the chargeback threshold 143A (e.g., the 4000 lowest attractivity transactions in the above example). Actuator 120 may then calculate an acquirer fee 121-C for the requested transaction 21 as an alternative cost of one or more other low-attractivity transactions. For example, in a condition that accepting a first requested transaction may require addition of one or more second transactions to the group of transactions that need to be dropped or refused, actuator 120 may calculate or modify the acquirer fee for the first requested transaction as a function (e.g., a sum) of lost acquirer fees of the one or more second, alternative transactions (e.g., due to acceptance of the requested transaction).

According to some embodiments, simulator module 110 may determine the policy of engagement by a process of a "what if" simulation. As elaborated herein, simulator module 110 may include a traffic prediction module 111, adapted to simulate the effect of each produced engagement policy 115A on incoming transactions 21 or transaction requests, and policy generator module 115 may be adapted to produce a plurality of policies of engagement data elements 115A, each comprising different policy data (e.g., as elaborated herein, in relation to FIG. 4B). Additionally, or alternatively, traffic prediction module 111 may be adapted to detect (e.g., by evaluation module 140) the effect of applying each of the plurality of policies of engagement 115A on the updated data elements of projected transactions, including for example: updated predicted CP (e.g., monthly) chargeback 142, updated predicted CP (e.g., monthly) volume 142F, predicted CP (e.g., monthly) chargeback overage (e.g., 142B, 142B') and a predicted acquirer revenue (e.g., as a sum of revenues from all acquired transactions).

Simulator module 110 may determine or select a policy of engagement 115A that may be optimal among the plurality of produced policies of engagement data elements 115A. The term 'optimal' may be used herein in a sense that the selected policy of engagement 115A may: (a) provide the highest projected acquirer revenue from the transactions (e.g., of the updated predicted CP (e.g., monthly) number of transactions 142F) among the plurality of produced policies 115A, and (b) take into consideration the CP (e.g., monthly) chargeback overage (e.g., provide a minimal predicted monthly chargeback overage 142B).

Figure 8:
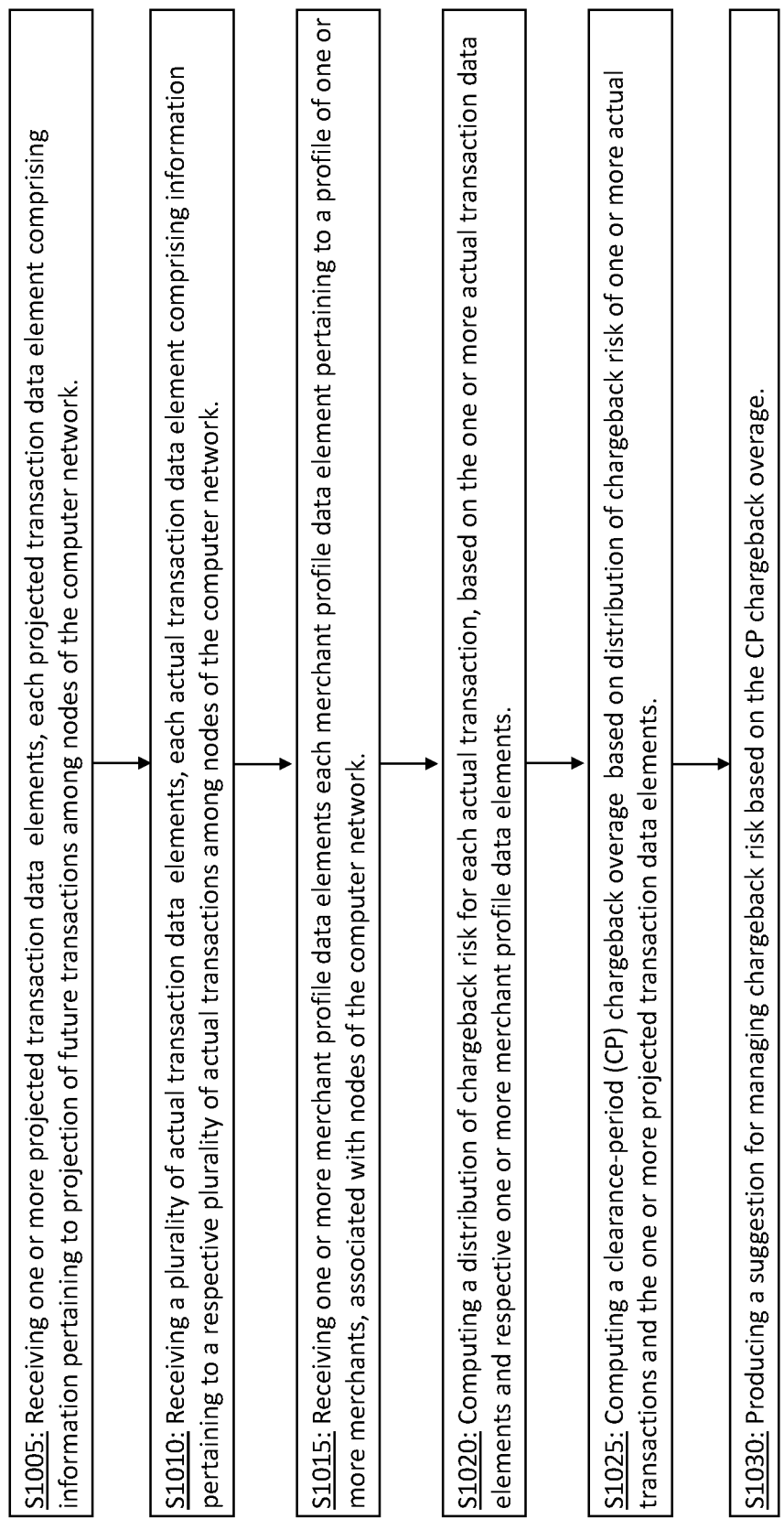
FIG. 8 is a flow diagram, depicting a method of managing chargeback risk, according to some embodiments.

Reference is now made to FIG. 8 which is a flow diagram, depicting a method of managing chargeback risk by at least one processor (e.g., element 2 of FIG. 1) of a computing device, according to some embodiments.

As shown in step S1005, the at least one processor 2 (e.g., a processor associated with or included in monitor module 130 of FIG. 4A) may receive one or more projected transaction data elements (e.g., elements 31 of FIG. 4A). Each projected transaction data element 31 (e.g., 31A, 31B) may include information pertaining to projection of future transactions among nodes (e.g., elements 20, 30 of FIG. 3) of the computer network 10.

As shown in step S1010, the at least one processor 2 (e.g., of monitor module 130) may receive a plurality of actual transaction data elements (e.g., elements 21 of FIG. 4A). Each actual transaction data element (e.g., 21A, 21B) may include information pertaining to a respective plurality of actual transactions among nodes (e.g., elements 20, 30 of FIG. 3) of the computer network 10.

As shown in step S1015, the at least one processor 2 (e.g., of monitor module 130) may receive one or more merchant profile data elements (e.g., element 21C of FIG. 4A). Each merchant profile data element 21C may pertain to a profile of one or more merchants, associated with computing nodes (e.g., merchant node elements 20 of FIG. 3) of the computer network 10.

As shown in step S1020, the at least one processor 2 (e.g., of monitor module 130) may compute a distribution of chargeback risk for each actual transaction (e.g., element 131A of FIG. 5), based on the one or more actual transaction data elements (e.g., 21A, 21B) and respective one or more merchant profile data elements (e.g., 21C).

As shown in step S1025, the at least one processor 2 (e.g., a processor associated with or included in evaluation module 140 of FIG. 6) may compute a CP (e.g., monthly) chargeback overage (e.g., elements 142B, 142B' of FIG. 6) based on distribution of chargeback risk of one or more actual transactions 131A and the one or more projected transaction data elements (e.g., 31A, 31B).

As shown in step S1030, the at least one processor 2 (e.g., associated with or included in simulator 110 and/or actuator 120 of FIG. 7) may produce a suggestion for managing chargeback risk (e.g., elements 121, 12F of FIG. 7), based on the CP chargeback overage (e.g., 142B, 142B'), as elaborated herein.

Embodiments of the invention may include a practical application for real-time management of acquisition of transactions and mitigation of chargeback risk. As elaborated herein, embodiments may include an improvement over currently available technology of computer networks for transaction management.

For example, embodiments may be adapted to mediate, in real time, between a plurality (e.g., thousands) of merchant computing devices and a plurality of banking and/or acquirer computing devices, as elaborated herein.

In another example, embodiments may be adapted to analyze incoming, actual, transaction-related data in real time, perform projection of future transaction-related and/or chargeback-related information, and manipulate (or producing suggestions for manipulating) one or more computing devices (e.g., acquirer computing devices, merchant computing devices) of computer networks for managing current, incoming transaction requests.

Additionally, embodiments may dynamically apply a simulation to assess one or more "what if" transaction scenarios, and produce suggestions for decreasing or mitigating chargeback risk for a current CP and/or for subsequent CPs, and/or for improving revenue, in view of a projected risk of chargeback. The simulation may be referred to as dynamic in a sense that it may be based on: (a) previously accumulated information (e.g., data pertaining to merchant profiles); (b) presently incoming data (e.g., data pertaining to actual transaction requests and chargeback events); (c) projected data (e.g., projected conditions, such as projected chargeback ratio); and (d) retrospective data (e.g., reevaluating the projected data due to changes in conditions such as a merchant's profile).

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of managing chargeback risk by at least one processor of a computing device in a computer network, the method comprising:

receiving one or more projected data transfer elements, each projected data transfer element comprising information pertaining to projection of future data transfers among nodes of the computer network, wherein the one or more projected data transfer elements are selected from a list consisting of: projected distribution over time of a volume of data transfers; and projected distribution over time of chargeback risk;

receiving a plurality of actual data transfer elements, each actual data transfer element comprising information pertaining to a respective plurality of actual data transfers among nodes of the computer network;

receiving one or more entity profile data elements each entity profile data element pertaining to a profile of one or more entities associated with one or more nodes of the computer network;

grouping, by a neural network, the one or more entities to entity clusters, according to the one or more entity profile data elements of the one or more entities;

computing a distribution of chargeback risk for each actual data transfer, based on one or more of the entity clusters, the one or more actual data transfer elements and respective one or more entity profile data elements;

computing a value of at least one clearance-period (CP) chargeback overage, based on distribution of chargeback risk of one or more actual data transfers and the one or more projected data transfer elements, wherein the computing of at least one CP chargeback overage comprises summing at least one distribution of chargeback risk for each of the actual data transfers and of the future data transfers, iteratively modifying, by a second neural network, a CP chargeback threshold according to a predicted probability, and comparing the sum to the CP chargeback threshold; and producing a suggestion to deny an actual data transfer based on the CP chargeback overage.

2. The method of claim 1, wherein the one or more entity profile data elements of a specific entity are selected from a list consisting of: an identification of the entity, a type of the entity, a volume of actual and future data transfers, and a percentage of charged back data transfers.

3. The method of claim 1, wherein computing a distribution of chargeback risk for each actual data transfer is performed in real time, as a weighted function of one or more of: a distribution of chargeback risk pertaining to an entity associated with the actual data transfer; a distribution of propensity for chargeback pertaining to a specific time of year; and a distribution of chargeback risk of similar actual and future data transfers.

4. The method of claim 1, further comprising computing the distribution of chargeback risk pertaining to a specific entity by:

detecting, from the data elements of actual data transfers, actual chargeback events that pertain to an entity cluster;

computing a chargeback propensity of actual data transfers pertaining to the entity cluster; and computing the distribution of chargeback risk pertaining to a specific entity as a weighted function of the percentage of actual charged back data transfers of that entity and the chargeback propensity of the respective entity cluster.

5. The method of claim 4, further comprising:

retroactively updating the one or more entity profile data elements according to incoming one or more actual data transfer elements;

retroactively updating the distribution of chargeback risk according to the updated one or more entity profile data elements; and producing one or more updated suggestions based on the updated distribution of chargeback risk.

6. The method of claim 1, wherein the one or more actual data transfer elements are selected from a list consisting of: an identification of an entity associated with an actual data transfer; a volume of actual data transfers, and events of actual data transfer chargeback.

7. The method of claim 6, further comprising computing a data transfer attractivity, for an actual data transfer of the one or more actual data transfers, representing an attractiveness of the actual data transfer for an entity.

8. The method of claim 7, wherein the method further comprises updating the one or more projected data transfer elements in view of incoming data elements of the plurality of actual data transfer elements.

9. The method of claim 8, wherein producing a suggestion comprises:

determining a policy of engagement, according to the CP chargeback overage; and producing one or more suggestions pertaining to respective one or more actual data transfers, based on the determined policy of engagement and on the attractivity of the one or more respective actual data transfers.

10. The method of claim 9, wherein the policy of engagement comprises data selected from a list consisting of: a number of actual data transfers that need to be dropped; and an identification of one or more entities corresponding to the actual data transfers that need to be dropped.

11. The method of claim 9, wherein determining a policy of engagement, comprises:

producing a plurality of policies of engagement, each comprising different policy data; and simulating each of the plurality of policies of engagement in view of the updated projected data transfer elements, to determine a policy of engagement that is optimal in terms the CP chargeback overage.

12. The method of claim 1, wherein the method comprises communicating the suggestion to one or more computing devices of respective entities.

13. The method of claim 12, further comprising:

receiving an actual data transfer request; and producing the suggestion to accept the actual requested data transfer.

14. A system for managing chargeback risk, the system comprising:

a non-transitory memory device, wherein modules of instruction code are stored, and at least one processor associated with the memory device, and configured to execute the modules of instruction code, whereupon execution of said modules of instruction code, the at least one processor is configured to:

receive one or more projected data transfer elements, each projected data transfer element comprising information pertaining to projection of future data transfers among nodes of the computer network, wherein the one or more projected data transfer elements are selected from a list consisting of: projected distribution over time of a volume of data transfers; and projected distribution over time of chargeback risk;

receive a plurality of actual data transfer elements, each actual data transfer element comprising information pertaining to a respective plurality of actual data transfers among nodes of the computer network;

receive one or more entity profile data elements each entity profile data element pertaining to a profile of one or more entities associated with one or more nodes of the computer network;

group, by a neural network, the one or more entities to entity clusters, according to the one or more entity profile data elements of the one or more entities;

compute a distribution of chargeback risk for each actual data transfer, based on one or more of the entity clusters, the one or more actual data transfer elements and respective one or more entity profile data elements;

compute a CP chargeback overage based on distribution of chargeback risk of one or more actual data transfers and the one or more projected data transfer elements, wherein the computing of a CP chargeback overage comprises summing at least one distribution of chargeback risk for each of the actual data transfer transfers and of the future data transfers, iteratively modifying, by a second neural network, a CP chargeback threshold according to a predicted probability, and comparing the sum to the CP chargeback threshold; and produce a suggestion to deny an actual data transfer based on the CP chargeback overage.

15. The system of claim 14, wherein the one or more entity profile data elements of a specific entity are selected from a list consisting of: an identification of the entity, a type of the entity, a volume of actual and future data transfers, and a percentage of charged back data transfers.

16. The system of claim 14, wherein the at least one processor is configured to compute the distribution of chargeback risk for each actual data transfer in real time, as a weighted function of one or more of: a distribution of chargeback risk pertaining to an entity associated with the actual data transfer; a distribution of propensity for chargeback pertaining to a specific time of year; and a distribution of chargeback risk of similar actual and future data transfers.

17. The system of claim 14, wherein the at least one processor is configured to compute the distribution of chargeback risk pertaining to a specific entity by:

detecting, from the data elements of actual data transfers, chargeback events that pertain to an entity cluster; computing a chargeback propensity of actual data transfers pertaining to the entity cluster; and computing the distribution of chargeback risk pertaining to a specific entity as a weighted function of the percentage of actual charged back data transfers of that entity and the chargeback propensity of the respective entity cluster.

18. The system of claim 17, wherein the at least one processor is configured to:

retroactively update the one or more entity profile data elements according to incoming one or more actual data transfer elements;

retroactively update the distribution of chargeback risk according to the updated one or more entity profile data elements; and produce one or more updated suggestions based on the updated distribution of chargeback risk.

* * * * *